US010878697B2

(12) United States Patent
Vadlamani et al.

(10) Patent No.: US 10,878,697 B2
(45) Date of Patent: Dec. 29, 2020

(54) METHOD AND SYSTEM TO CONTROL TRAFFIC SPEED THROUGH INTERSECTIONS

(71) Applicant: Cubic Corporation, San Diego, CA (US)

(72) Inventors: Srikar Vadlamani, Sugarland, TX (US); Matthew Davidson, Cupertino, CA (US)

(73) Assignee: Cubic Corporation, San Diego, CA (US)

( * ) Notice: Subject to any disclaimer, the term of this patent is extended or adjusted under 35 U.S.C. 154(b) by 0 days.

(21) Appl. No.: 16/592,139

(22) Filed: Oct. 3, 2019

(65) Prior Publication Data

US 2020/0111351 A1    Apr. 9, 2020

Related U.S. Application Data

(60) Provisional application No. 62/742,014, filed on Oct. 5, 2018, provisional application No. 62/753,449, filed on Oct. 31, 2018.

(51) Int. Cl.
*G08G 1/052* (2006.01)
*H04W 4/46* (2018.01)
*G08G 1/01* (2006.01)

(52) U.S. Cl.
CPC .......... *G08G 1/052* (2013.01); *G08G 1/0116* (2013.01); *H04W 4/46* (2018.02)

(58) Field of Classification Search
CPC ...... G08G 1/052; G08G 1/0116; G08G 1/042; G08G 1/00; G08G 1/01; G08G 1/012; G08G 1/0125; G08G 1/0129; G08G 1/0133; G08G 1/0141; G08G 1/0145; G08G 1/04; G08G 1/065; G08G 1/07; G08G 1/08; G08G 1/0962; G08G 1/096733; G08G 1/0968; G08G 1/0969; G08G 1/097; G08G 1/123; G08G 1/127; G08G 1/13; G08G 1/20; H04W 4/46; H04W 4/00;

(Continued)

(56) References Cited

U.S. PATENT DOCUMENTS 8,855,902 B2    10/2014 Neel et al.
9,020,742 B2    4/2015 Neel et al.
(Continued)

OTHER PUBLICATIONS

International Search Report and Written Opinion dated Dec. 19, 2019 in related application No. PCT/US2019/054633, all pgs.

*Primary Examiner* — Anthony R Jimenez
(74) *Attorney, Agent, or Firm* — Kilpatrick Townsend & Stockton LLP

(57) ABSTRACT

A system includes sensors deployed along a vehicle pathway to detect the presence of a plurality of vehicles. An embodiment of a method for detecting speed may include generating from the sensors presence data of each of the plurality of vehicles and transmitting the detected presence data to a base station. The transmitting may include transmitting the detected presence data from the sensors to an access point and transmitting the detected presence data from the access point to the base station. The base station determines a speed of each of the plurality of vehicles. The speed may be determined at a periodic interval responsive to a predetermined distance between the sensors and a difference in the detection time of each of the plurality of vehicles at each of the sensors.

19 Claims, 19 Drawing Sheets

(58) Field of Classification Search
CPC ......... H04W 4/029; H04W 4/38; H04W 4/40;
H04W 4/42; H04W 4/44; G01S 19/26;
G01S 19/27; G01S 19/38; G01S 19/42;
G01S 19/52; G01S 15/46; G01S 15/465;
G01S 15/50; G01S 15/58; G01S 2013/91;
G01S 1/00; G01S 1/02; G01S 1/06; G01S
1/08; G01S 3/00; B60W 2550/00; B60W
2550/30; B60W 2550/308; B60W
2550/40; B60W 2550/402; B60W
2550/404; B60W 2550/406; B60W
2550/408; G01P 3/00
USPC .......... 701/119; 340/870.01, 870.03, 870.04,
340/870.05, 870.06, 907, 909, 910, 915,
340/933, 935, 941, 988, 989–994, 995.1
See application file for complete search history.

(56) References Cited

U.S. PATENT DOCUMENTS

| | | |
|---|---|---|
| 9,412,270 B2 | 8/2016 | Neel et al. |
| 9,489,840 B2 | 11/2016 | Neel et al. |
| 9,607,220 B1 * | 3/2017 | Smith ................... G06K 9/325 |
| 2005/0190077 A1 | 9/2005 | Kavaler |
| 2011/0298603 A1 | 12/2011 | King et al. |
| 2014/0240146 A1 | 8/2014 | Neel et al. |

* cited by examiner

METHOD AND SYSTEM TO CONTROL TRAFFIC SPEED THROUGH INTERSECTIONS

CROSS-REFERENCES TO RELATED APPLICATIONS

This application is a nonprovisional of and claims the benefit of priority to U.S. Provisional Patent Application No. 62/742,014, filed Oct. 5, 2018, entitled "METHOD AND SYSTEM TO CONTROL TRAFFIC SPEED THROUGH INTERSECTIONS," and U.S. Provisional Patent Application No. 62/753,449, filed Oct. 31, 2018, entitled "METHOD AND SYSTEM TO CONTROL TRAFFIC SPEED THROUGH INTERSECTIONS", the entire contents of which are herein incorporated by reference.

BACKGROUND OF THE INVENTION

As cities and roadways become increasingly congested, people are relying more on vehicular detection systems to calculate speeds for traffic control. In many instances, however, these systems are expensive to deploy and particularly inaccurate due to incomplete data. Conventional solutions may employ a method of determining average speed for an automobile passing over certain measurement devices. In such methods, if all times of arrival or detection and positions of the sensors are known, the average speed of the automobile over the distance between the first and last sensors can be calculated by adding the distances between the first and last sensor and dividing this distance by the time of arrival at the last sensor minus the time of arrival at the first sensor. However, in the event that some of these arrival times are missing and multiple automobiles or other vehicles are passing over the sensors in a given period of time, then this conventional method will not produce reliable speed calculations for all vehicles. Indeed, correlation of the arrival times at each of the several sensors is essential to determine speeds accurately. Accordingly, it is recognized that there exists a need for systems and methods that can accurately control the speed of vehicle traffic.

BRIEF SUMMARY OF THE INVENTION

Embodiments of the invention are related to systems and methods to enhance accuracy in controlling speed of vehicle traffic, such as through traffic intersections.

In one embodiment, a system for detecting speed of vehicle traffic includes a plurality of sensor pods positioned along a vehicle pathway. Each of the plurality of sensor pods is positioned to detect presence data of a plurality of vehicles and broadcast the presence data to an access point. The access point is positioned to receive the detected vehicle presence data from the plurality of sensor pods and transmit the detected vehicle presence data to a base station. The base station, in turn, is positioned remote from the access point, positioned to receive the detected presence data from the access point, and positioned to determine speed of each of the plurality of vehicles even when one or more of the plurality of sensor pods fails to detect the presence of one of the plurality of vehicles. The vehicle speed may be determined at a periodic interval responsive to a predetermined distance between the plurality of sensor pods and a difference in the detection time of the vehicle at each of the plurality of sensor pods.

In another embodiment, a method of controlling vehicle traffic of a plurality of vehicles when traveling along a vehicle pathway includes generating from a plurality of sensors presence data of each of a plurality of vehicles and transmitting the detected presence data to a base station. The transmitting, for example, may include a first transmission of the detected presence data from the plurality of sensor pods to an access point and a second transmission of the detected presence data from the access point to the base station. The method also includes determining at the base station speed of each of the plurality of vehicles. The speed determined at a periodic interval responsive to a predetermined distance between the plurality of sensor pods and a difference in the detection time of each of the plurality of vehicles at each of the plurality of sensor pods. The method further may include displaying the determined speed on a graphical user interface thereby to enhance control of traffic along the vehicle pathway.

In yet another embodiment, a method of controlling speed of a plurality of moving vehicles when passing along a vehicle pathway may include providing a plurality of spaced-apart sensors in a series alignment to determine presence of the one or more moving vehicles and outputting sensed data from each of the plurality of sensors in a form of an arrival time corresponding to the presence of the plurality of moving vehicles. The method also includes determining one or more speeds of each of the plurality of moving vehicles in the absence of a complete set of arrival times and determining the one or more speeds of the plurality of moving vehicles when passing the plurality of sensors in rapid succession and in the absence of a complete set of arrival times.

The embodiment of the method further includes generating a first data table with columns for each sensor and rows to be populated with one or more distances between the plurality of spaced-apart sensors; and generating a second data table with columns for each sensor and rows to be populated with one or more arrival times associated with the plurality of moving vehicles sensed by the one or more spaced-apart sensors. The method also includes providing a predefined amount of timeout value representative of the time to wait to perform speed determinations after observing the one or more arrival times; correlating the one or more arrival times; and reporting the one or more speeds determined along with relevant statistical data (e.g. standard deviation of the speed calculated).

An embodiment of the method further may include populating data related to detection events in a table, checking for the detection events, entering the detection events to a detection data table if a detection event is found, and resetting a timer to repeat the data populating of the table. Alternatively, the method may include incrementing a timer if no detection event is found, checking the timer count against the predefined amount of timeout value, determining speed if the predefined amount of timeout threshold has been met, and populating the data into the table if the predefined amount of timeout has not been met.

An embodiment of a speed determination routine, for example, may include searching for the earliest arrival time in a row of a detection data table. If there is no value is found during the search, the routine may continue to populate data into the table. Alternatively, the routine may include determining speed responsive to the earliest arrival time and the corresponding distance if a value is found during the search.

An embodiment of the speed determination routine further may include checking an adjacent cell in a row of the detection data table for a value within the predefined amount of timeout value and determining speed responsive to the corresponding value in the cell and the corresponding distance if the adjacent cell is within the predefined amount of timeout value. The routine still further may include checking the adjacent cell until the adjacent cell does not exist or is not within the predefined amount of timeout value. Alternatively, if the right adjacent cell does not exist or is not within the predefined amount of timeout value, then the routine may determine average speed and variance using the data in the speed determination array.

Embodiments further include a method of accommodating multiple groups of arrival sensors each with individual location tables and arrival time table, and calculating speeds for each group of sensors, and a method of accommodating sensors shared among multiple groups such that the arrival times observed by a shared sensor are used to calculate speeds for multiple groups.

In another embodiment, a method of accommodating multiple sensors in the same position such that the arrival time reported for paired sensors may be chosen based the earliest (within a relevant time interval) arrival time from the paired sensors; average of the arrival times (within a relevant time interval) from the paired sensor, or the latest arrival time (within a relevant time interval) from the paired sensors. The time interval for criteria above may be determined by the expected variation in speed measurements due to uncertainty in the measurement process or by estimation of the probability of uncorrelated events being observed within a time interval.

In one embodiment, the limit variable used to determine the amount of time to wait before performing a speed calculation may be eliminated and the speed calculation routine called when the table of arrival time data reaches a maximum length. In another embodiment, speeds may be reported only if a full set of correlated arrival times are available. Alternatively, speeds may be reported only if a full set of correlated arrival times are available and the standard deviation of the speed calculated is within a specified limit or the speed calculation routine may avoid reporting any speed calculated that is physically impossible or outside a range of expected speeds.

In a further embodiment, a speed determination routine does not assume the direction in which the vehicle travelled but instead examines the arrival time data for evidence of directionality. This alternate speed determination routine may rely on the use of multiple sensors in the same position to reduce the possibility of incorrect directionality determinations. This method, for example, may include: a routine for correlating the arrival time data with events associated with the passing of individual vehicles; a routine for limiting errors in direction determination in the case that correlated arrival time data are not in full agreement; a routine for reporting the direction and speed determined by the routine; and a routine for reporting any case in which the direction determined is not as expected (e.g., "wrong-way" or in the reverse order of the sensor locations as determined by the data table of sensor locations).

Embodiments of methods and systems to control traffic speed, for example, may be beneficial to calibrate and optimize traffic signal timing, identify congestion levels, trigger or determine traffic patterns, control signal timing and operations, increase or decrease the number of vehicle pathway or roadway lanes, and determine offset such as for calibrating the coordination of signals along a corridor, among others.

In one embodiment, a speed detection system for vehicle traffic is provided. The system may include a plurality of sensor pods positioned along a vehicle pathway. Each of the plurality of sensor pods may be positioned to detect presence data of a plurality of vehicles and broadcast to a base station the detected presence data. The base station may be positioned remote from the plurality of sensor pods and may be configured to receive the detected presence data and determine speed of each of the plurality of vehicles even when one or more of the plurality of sensor pods fails to detect the presence of one of the plurality of vehicles. The vehicle speed may be determined at a periodic interval responsive to a predetermined distance between the plurality of sensor pods and a difference in a detection time of the vehicle at each of the plurality of sensor pods.

In some embodiments, the system may also include an access point that may be positioned to receive the detected presence data from the plurality of sensor pods and transmit the detected presence data to the base station. In some embodiments, the system may further include a remote device that is configured to receive the determined speed of each of the plurality of vehicles and display a graphical user interface that includes the determined speed of each of the plurality of vehicles in response to receiving the determined speed of each of the plurality of vehicles. In some embodiments, determining the speed of each of the plurality of vehicles may include examining arrival time data for evidence of directionality of a particular vehicle and using multiple sensors in a same position to reduce a possibility of incorrect directionality determinations. In some embodiments, determining the speed of each of the plurality of vehicles may further include correlating the arrival time data with events associated with a passing of individual objects, limiting errors in direction determination when correlated arrival time data are not in full agreement, reporting a direction and speed determined of the individual objects, and reporting any case in which the direction determined is not as expected. In some embodiments, the plurality of sensor pods may be spaced apart along the vehicle pathway in a location underlying the vehicle pathway. In such embodiments, two or more of distances between any two of the plurality of sensors are not the same. In some embodiments, the plurality of sensor pods may be spaced apart along the vehicle pathway in a uniform manner.

In another embodiment, a method for controlling vehicle traffic of a plurality of vehicles when traveling along a vehicle pathway is provided. The method may include generating, from a plurality of sensors, presence data of each of a plurality of vehicles, transmitting the presence data to a base station, and determining, at the base station, a speed of each of the plurality of vehicles. The speed may be determined at a periodic interval based at least in part on a predetermined distance between the plurality of sensors and a difference in a detection time of each of the plurality of vehicles at each of the plurality of sensors. The method may also include displaying the determined speed on a graphical user interface thereby to control traffic along the vehicle pathway.

In some embodiments, transmitting the presence data to a base station may include a first transmission of the presence data from the plurality of sensors to an access point and a second transmission of the presence data from the access point to the base station. In some embodiments, generating the presence data may include outputting sensed data from each of the plurality of sensors in a form of an arrival time corresponding to the presence of the plurality of moving vehicles. In some embodiments, determining the speed of each of the plurality of vehicles may include generating a first data table with columns for each sensor and rows to be populated with one or more distances between the plurality of sensors, generating a second data table with columns for each sensor and rows to be populated with one or more arrival times associated with the plurality of moving vehicles sensed by the plurality of sensors, providing a predefined amount of timeout value representative of the time to wait to perform speed determinations after observing the one or more arrival times, and correlating the one or more arrival times. In some embodiments, the method may further include populating data related to detection events in a table, checking for the detection events, entering the detection events to a detection data table if a detection event is found, resetting a timer to repeat the data populating of the table, incrementing a timer if no detection event is found, and checking a count of the timer against the predefined amount of timeout value. In some embodiments, the speed of each of the plurality of vehicles may be determined only if the predefined amount of timeout value has been met. In some embodiments, determining the speed of each of the plurality of vehicles may include calculating distances between each of the plurality of sensors for each measurement present in the presence data, calculating a difference of each arrival time in the presence data, calculating a sum of all the distances between the plurality of sensors, and calculating the sum of all differences of arrival times.

In another embodiment, a method of operating a base station is provided. The method may include receiving, from a plurality of sensors, presence data of each of a plurality of vehicles and determining a speed of each of the plurality of vehicles. The speed may be determined at a periodic interval based at least in part on a predetermined distance between the plurality of sensors and a difference in a detection time of each of the plurality of vehicles at each of the plurality of sensors. The method may also include sending the determined speed of each of the plurality of vehicles to a remote device, thereby causing the remote computing device to display a graphical user interface comprising the determined speed.

In some embodiments, the speed of each of the plurality of vehicles may be determined based at least in part on an earliest arrival time as detected by each of the plurality of sensors. In some embodiments, determining the speed of each of the plurality of vehicles may include determining an average speed and variance of the speed of each of the plurality of vehicles. In some embodiments, the speed for at least one of the plurality of vehicles may be determined using only presence data from a subset of the plurality of sensors. In some embodiments, the presence data may be received from the plurality of sensors via an access point. In some embodiments, the access point may be positioned within 700 feet of at least some of the plurality of sensors.

BRIEF DESCRIPTION OF THE DRAWINGS

Various embodiments according to the present disclosure will be described with reference to the drawings, in which.

DETAILED DESCRIPTION OF THE INVENTION

Figure 1A:
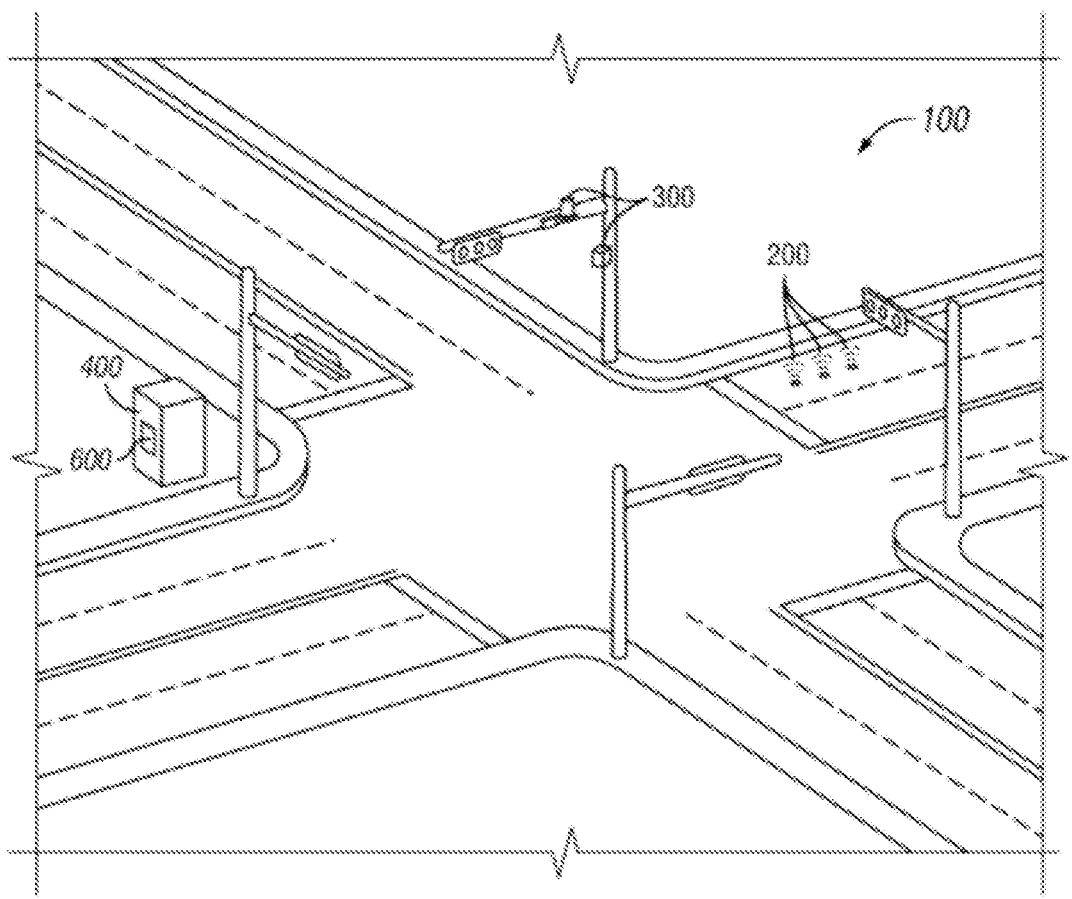
FIG. 1A is a schematic top plan, environmental view of a system to control traffic speed through intersections according to various disclosed embodiments.

Systems and methods in accordance with various embodiments of the present disclosure overcome deficiencies experienced in conventional approaches to controlling and monitoring traffic speed through intersections.

Although one of ordinary skill in the art could readily envision various implementations for the present disclose, one system in which this disclose is employed comprises a sensor that detects and transmits vehicle presence data. The concept of wireless vehicular tracking was introduced in U.S. patent application Nos. 61/770,606, 61/770,789, 61/770,951 all filed Feb. 28, 2013, and entitled Wireless Vehicle Detection System and Associated Methods Having Enhanced Response Time; Wireless Vehicle Detector Aggregator and Interface to Controller and Associated Methods; and Wireless Vehicle Detection System, Sensor Pods; and Associated Methods, now U.S. Pat. Nos. 8,855,902; 9,020,742; 9,412,270; and 9,489,840 all of which are incorporated herein by reference.

The foregoing aspects, features, and advantages of the present invention will be further appreciated when considered with reference to the following description. In describing the embodiments of the invention illustrated in the appended drawings, specific terminology will be used for the sake of clarity. However, the invention is not intended to be limited to the specific terms used, and it is to be understood that each specific term includes equivalents that operate in a similar manner to accomplish a similar purpose.

Described herein is a novel and highly reliable method in regard to speed determination methods and more particularly to methods for determining speed based on a correlation of data from multiple sensors with some probability of data loss. The method described herein provides such capability by creating improved methods for calculating speeds of moving objects travelling over a series of arrival sensors with known locations and some non-zero probability of failure to detect. All arrival times for the series of sensors are recorded in a table. In addition to recording times in a table, a separate table containing the distances between each sensor is provided. The processing unit calculates speeds by combining the arrival time table and the distances table.

Embodiments of the present disclosure include a wireless speed detection system and methods to determine vehicle traffic speed. These, for example, may include such determinations based on a correlation of data from multiple sensors with some probability of loss. Embodiments of the present disclosure include, for example, one or more wireless sensor pods having extended range and battery life that enables the wireless speed detection system according to embodiments of the present disclosure to communicate over long distances for a number of years (e.g., five years or more) without repeaters. Embodiments of the disclosure provide, for example, enhanced response times and lower latency by providing sensor pods that are adapted to communicate directly with access points over long distances (e.g., 300 feet or more). Embodiments of the present disclosure provide a cost-effective speed detection system for controlling, monitoring and determining speeds of vehicles travelling over a plurality, e.g., a series, of sensors.

An embodiment of the present disclosure provides the determination of speeds of vehicles passing over a series of position-specific arrival time sensors. Other embodiments of the present disclose provide determination of speeds of vehicles passing over sensors in rapid succession. Another embodiment of the disclosure provides for determination of speeds of vehicles passing over sensors even when a sensor fails to report the arrival time of the vehicle. Yet another embodiment of the disclosure provides determining variance for the determined speed and preventing erroneous recordation of physically impossible speed determinations.

Figure 1B:
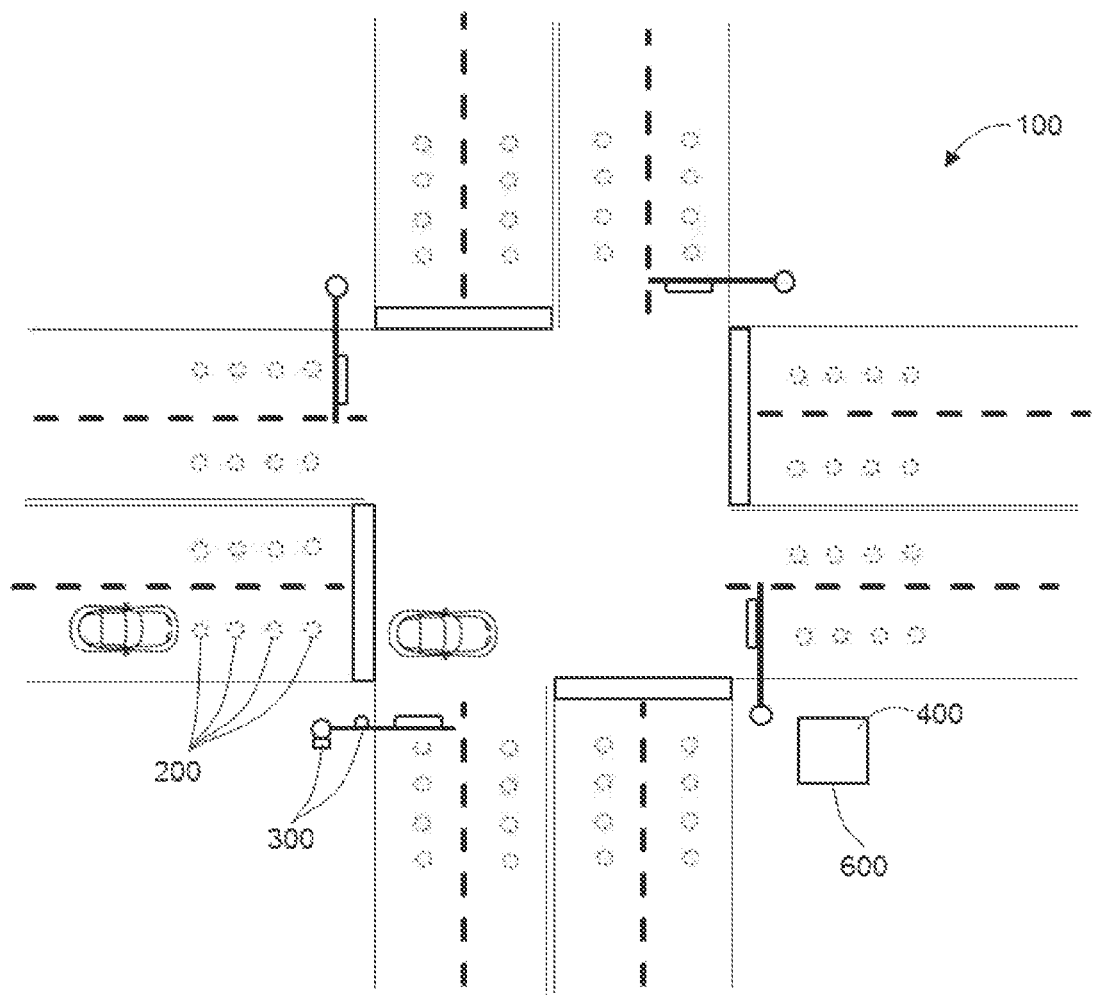
FIG. 1B is a schematic top plan, environmental view of a system to control traffic speed through intersections according to a disclosed embodiment.

As illustrated in FIGS. 1A and 1B, the vehicle detection system 100 may include a plurality of wireless sensor pods 200 that detect the presence and speed of a plurality of vehicles and positioned along a vehicle pathway, e.g., in or below the road surface, an access point 300, which may be mounted to a structure, such as a traffic pole, (or positioned elsewhere) and adapted to receive data sensed by the sensor pods, and a base station 400 positioned remote from and in communication with the access point. In some embodiments, the base station 400 may be positioned within a traffic controller cabinet 600 to provide data signal processing as will be understood by those skilled in the art.

Figure 2:
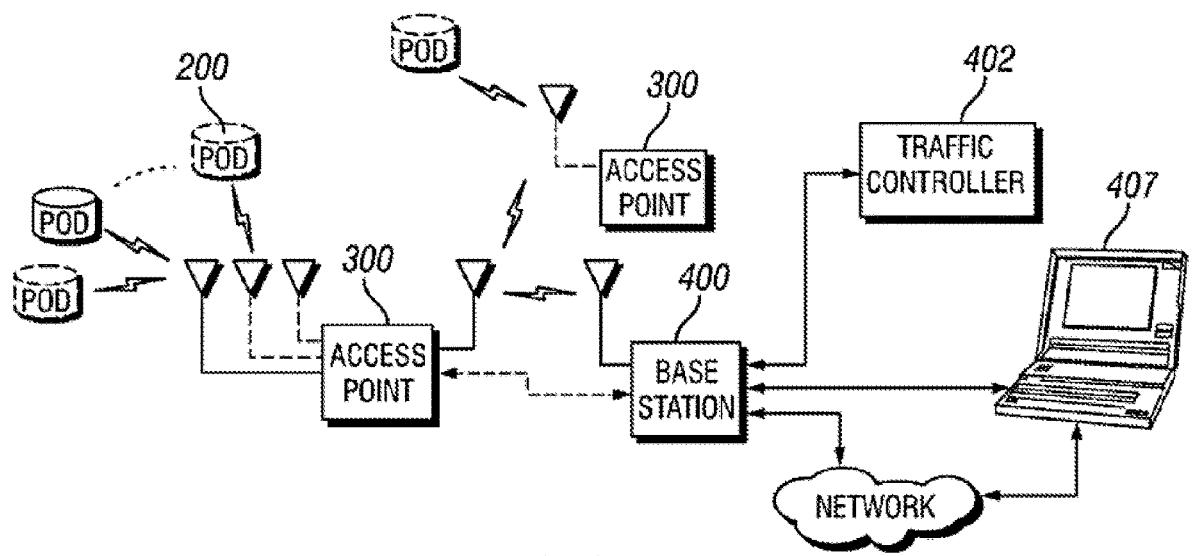
FIG. 2 is an exemplary schematic diagram of a system to control traffic through intersections according to various disclosed embodiments.

As illustrated in FIG. 2, embodiments of vehicle speed detection system 100 may include one or more access points 300 each that communicate with one or more sensor pods 200 in a traffic region Zone or an intersection as an example of vehicle pathways. According to an embodiment of present disclosure, each Zone includes one or more sensor pods 200 in communication with an access point 300.

The base station 400 may provide data processing and storage for the speed detection system and may be connected to a Wide Area Network or Local Area Network and a traffic controller 402 as understood by those skilled in the art. Embodiments of the speed detection system 100 enable a user to monitor, configure, or control the vehicle detection system 100 using a remote device 407. In some embodiments, rather than including access points 300, the sensor pods 200 may be configured to communicate directly with the base station 400. In other embodiments, the access point 300 and base station 400 may be integrated into a single unit.

Figure 3:
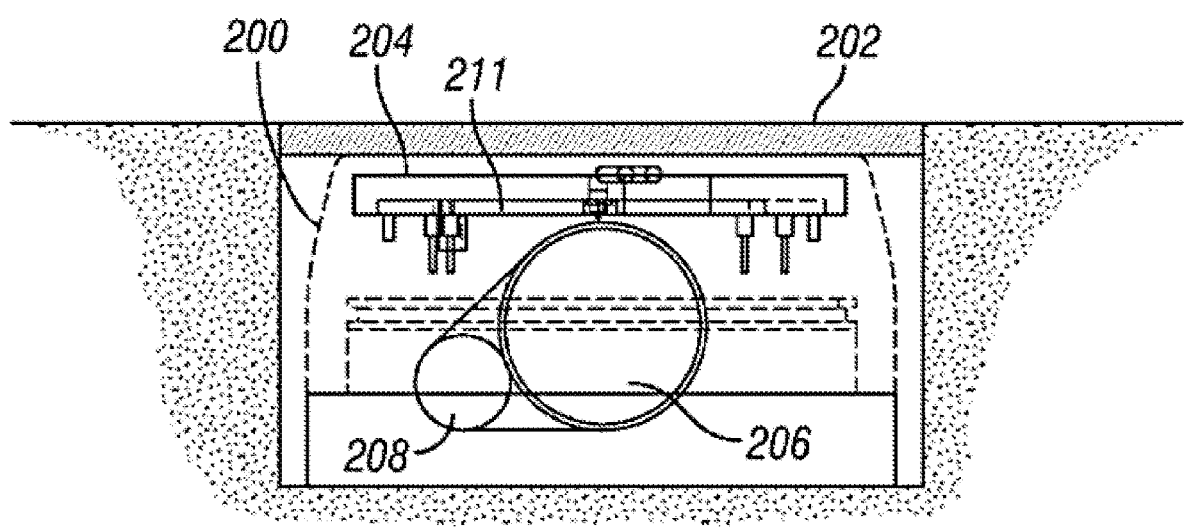
FIG. 3 is a schematic environmental view of a sensor pod positioned in a vehicle pathway of a system according to various disclosed embodiments.

FIG. 3 illustrates a sensor pod 200 installed below a road surface. Embodiments of the sensor pod 200 may include, for example, an antenna 204 adapted to communicate with the access point 300, a PC board 211 where one or more electronic hardware components attach thereto, a battery 206, and a hybrid layer capacitor (HLC) 208 connected in parallel electrically to the battery 206 to protect the battery from degradation as understood by those skilled in the art. It will be appreciated that other designs of sensor pods 200 may be utilized in accordance with the present disclosure.

Figure 4:
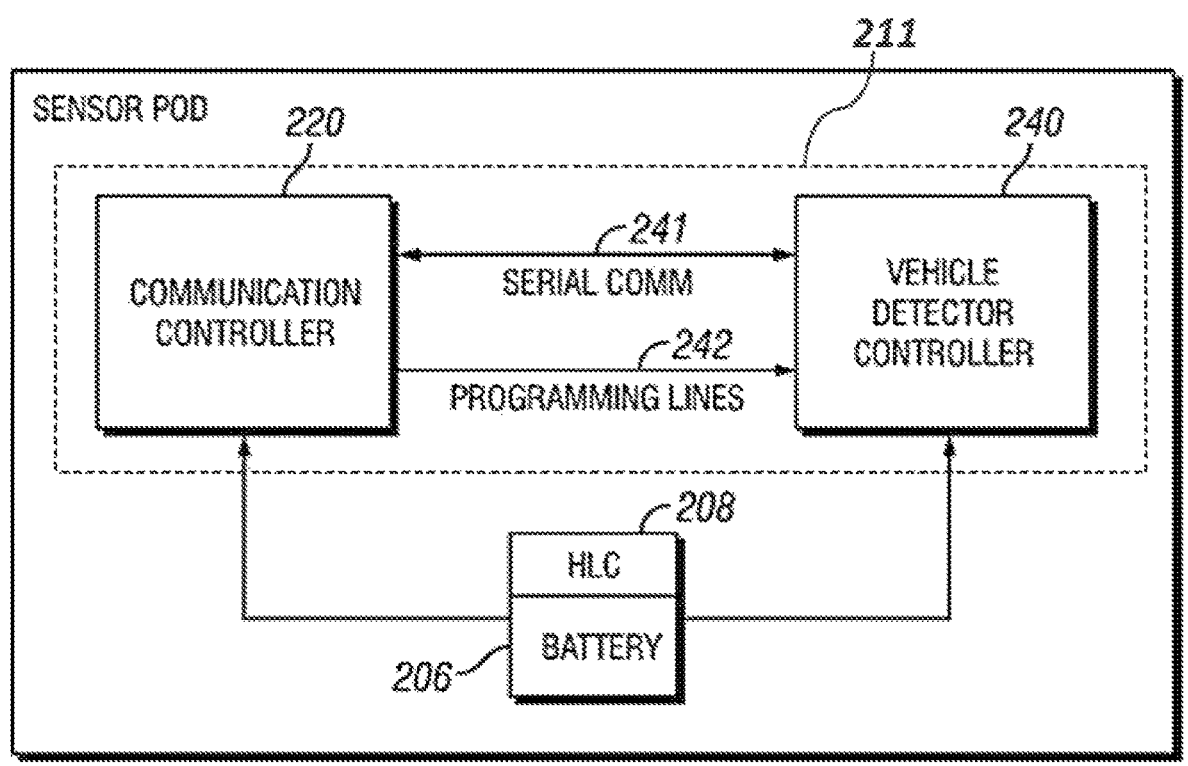
FIG. 4 is a schematic block diagram of a sensor pod of a system according to a disclosed embodiment.

As illustrated in FIG. 4, embodiments of the sensor pod may include a speed detector controller 240 to detect the presence and speed of each of a plurality of vehicles and a communication controller 220 that communicates data relating to the speed or presence of one or more vehicles to the access point 300. The vehicle detector controller 240 and the communication controller 220, for example, may be connected by a serial communication link 241 such as SPI, UART, or other communication links as understood by those skilled in the art. One or more program lines 242 also may be used to connect or control the two controllers 220, 240.

According to an embodiment, the speed detector controller 240 and the communication controller 220 each have separate clock cycles and separately controlled sleep cycles for drawing power. The battery 206 of the sensor pod is large enough to support transmit power sufficient to achieve at least 300 feet or more. In an example embodiment, the battery 206 is a lithium thionylchloride, compact D size and is capable of storing a substantial charge for several years. The battery 206 may provide power to the sensor pod 200 for up to 10 years with an average of 700 activations per hour, twenty four hours a day, every day of the week and may be replaced as needed according to an embodiment of the disclosure. In some embodiments, the battery life is up to 5 years. According to various embodiments of the present disclosure, the battery 206 is electrically connected in parallel (or in other arrangements) to one or more HLC capacitors 208 to support high current operations. As understood by those skilled in the art, the HLC capacitor 208 also protects the battery 208 from degradation at transit power by reducing the load on the battery and thereby extends the life of the battery 206.

An embodiment of the sensor pod 200 has the capability to transmit at a high power of approximately 20 dBm to the access point 300. Together the communication controller 220 and speed detector controller 240 manage the power from the power source. The HLC capacitor 208 electrically attached in parallel (or in other arrangements) to the battery allows for high current draw which supports the high power radio transmissions. One or both of the controllers 220, 240 are adapted to detect the signal strength of a received signal from the access point 300 and adjusting the transmitting power based upon that strength such that power is conserved, thereby lengthening battery life. An embodiment of the sensor pod 200, for example, provides extended range features that allow the pod to communicate with the access point 300 without repeaters and with a long battery life.

Figure 5:
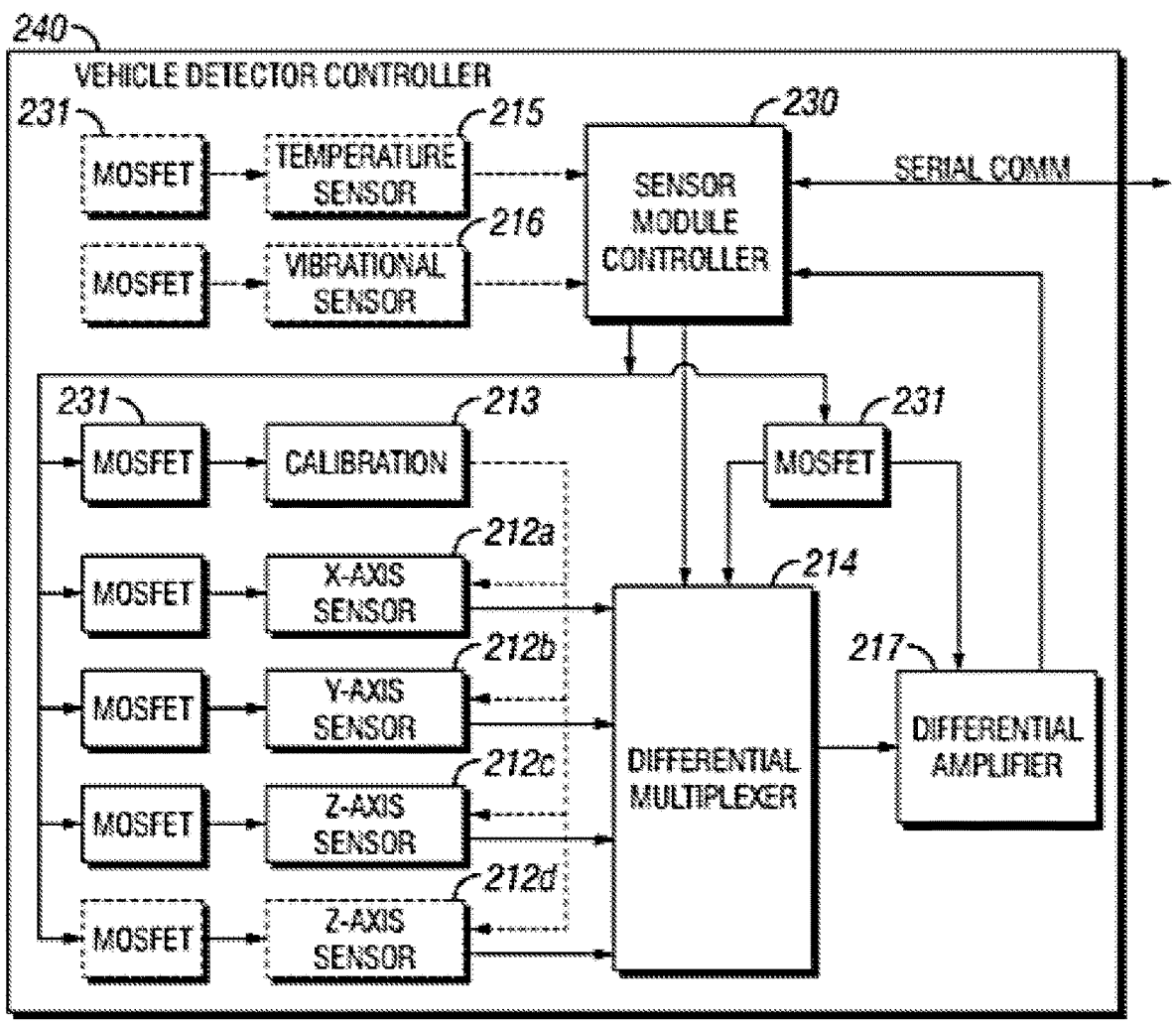
FIG. 5 is a schematic block diagram of a vehicle detector controller of a system according to a disclosed embodiment.

FIG. 5 illustrates an embodiment of the vehicle detector controller 240 that is adapted to sense parameters for detecting vehicles, measuring vehicle occupancy, determining vehicle arrival time, counting the number of detected vehicles, detecting parameters for speed determinations, and other parameters for a broad range of transportation and traffic applications.

An embodiment of the vehicle detector controller 240 may include, for example, a plurality of Anisotropic Magneto-Resistive based magnetic sensors 212a-d adapted to sense parameters of vehicles. Vehicles contain ferrous materials that disturb the uniform intensity and direction of the Earth's magnetic field. Embodiments of the sensor pods 200 may include one or more magnetic sensors 212 to detect disturbances of the Earth's magnetic field created by a vehicle (e.g., car, truck, or motorcycle). In some embodiments, one or more of the plurality of magnetic sensors 212 may act as redundant sources of vehicle detection in the event that a magnetic sensor fails. It will be appreciated that other forms of vehicle detection are possible in some embodiments.

Figure 21:
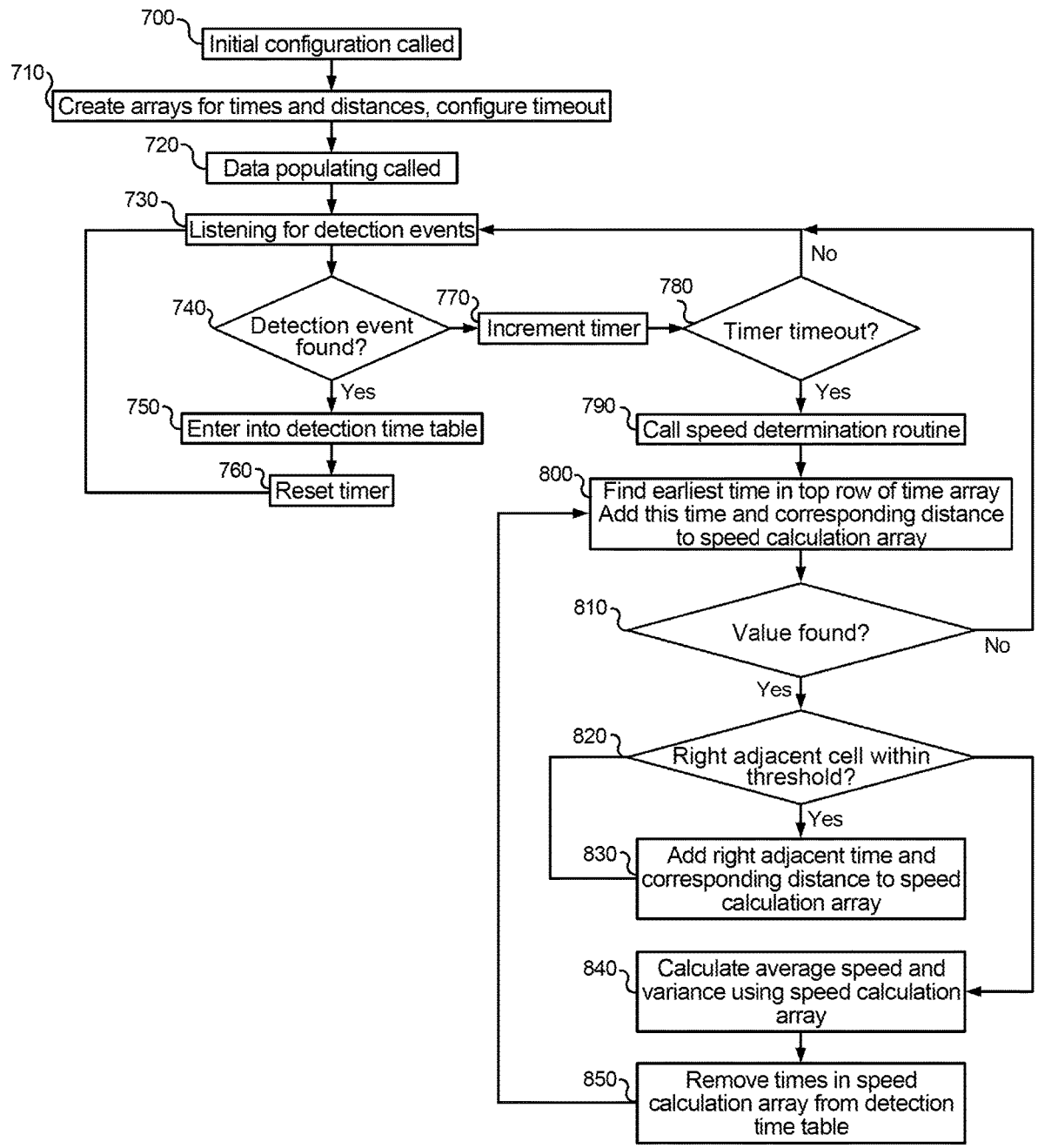
FIG. 21 is a flow diagram of a method for determining speed of a plurality of vehicles through one or more intersections according to a disclosed embodiment.
Figure 22:
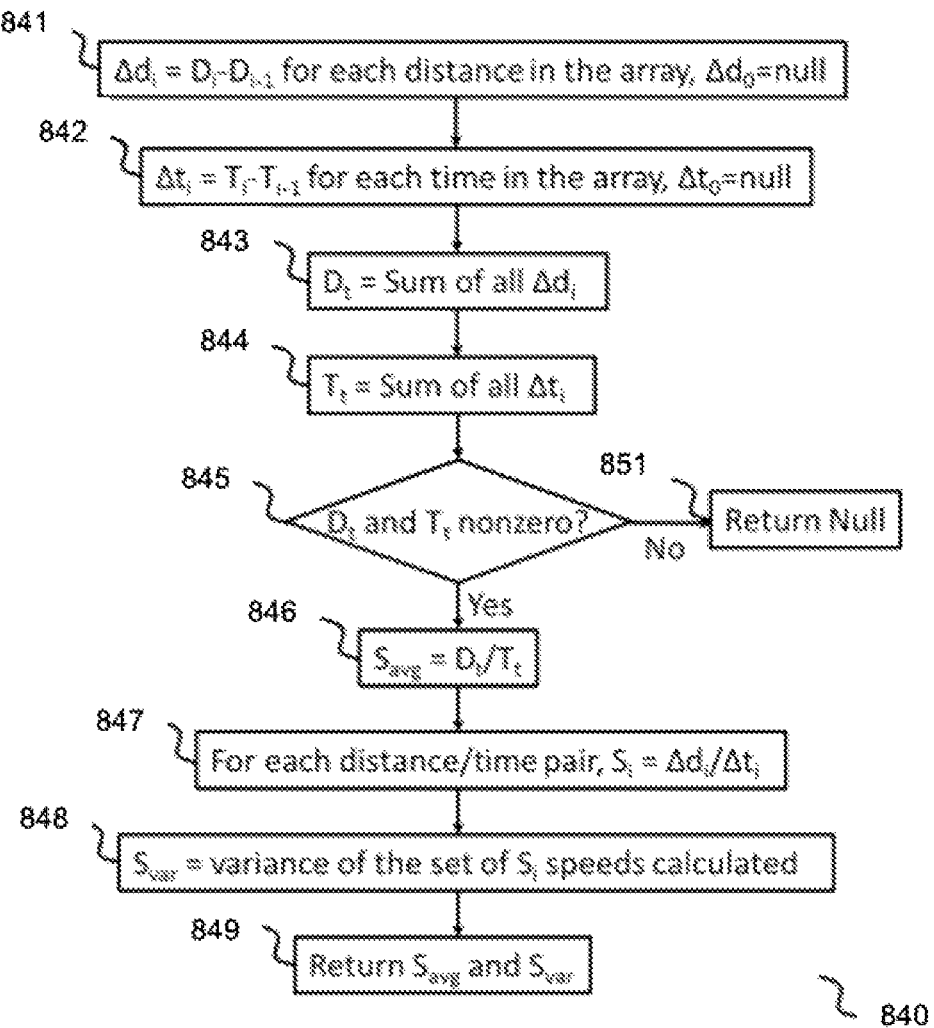
FIG. 22 is a flow diagram of a method for determining speeds of vehicles through intersections according to a disclosed embodiment.

As illustrated in FIG. 5, the vehicle detector controller 240 may include an x-axis magnetic sensor 212a, a y-axis magnetic sensor 212b, and a z-axis magnetic sensor 212c. In certain embodiments, the vehicle detector controller 240 may include two z-axis magnetic sensors 212c, 212d spaced apart in a single sensor pod to determine the speed of each of a plurality of passing vehicles. The dual sensors 212c, 212d also may act as redundant sensors if one of the sensors fails to operate properly. In other embodiments the dual magnetic sensors may be two y-axis or x-axis sensors, or a combination of the x, y, or z-axis sensors and/or any other combination of sensors. With dual placed magnetic sensors, the first magnetic sensor will experience a detection of the passing vehicle a fraction of a second before the second sensor in moving traffic. With a predetermined displacement distance between two magnetic sensors and time measurement between the two magnetic sensors, a speed computation may be made using a single sensor pod. In some embodiments, a plurality of sensor pods 200 may be placed at a predetermined displacement distance and used to determine the speed of each of a plurality of passing vehicles. FIGS. 21 and 22 illustrate several speed determination methods as will be understood by those skilled in the art upon disclosure herein.

Speed computation, for example, may be performed by the sensor module controller 230 in the vehicle detector controller 240 and/or by one or more remote devices 407 that receive data sensed by the sensor pod 200. The sensor module controller 230 also may receive sensed data from one or more temperature 215 and vibration 216 sensors and process the sensed data to determine, for example, the presence of ice, snow, water, or temperature measurements. Signal processing functions of the sensor module controller 230 also may include characterizing sensed vibrations data to facilitate the detection and classification of a vehicle.

The sensor module controller 230 further may be adapted to determine if one or more of the magnetic sensors 212 is operating within satisfactory limits and generate a signal or alarm if the one or more sensors are not operating satisfactory. This signal or alarm may be based on historical measured values of the sensors. The signal or alarm may be transmitted to the base station 400 or the traffic controller 402 and/or other device for further action by field personnel for example.

Embodiments of the vehicle detector controller 240 also may include a calibration module 213 adapted to adjust for sensor offset, or to set or reset one or more of the plurality of magnetic sensors 212. The vehicle detector controller 240 also may utilize one or more power control devices such as MOSFETs 231, as will be understood by those skilled in the art, to intermittently supply power to different circuitry components including the plurality of magnetic sensors 212. According to an embodiment of the present disclosure, the output of the plurality of magnetic sensors 212 is routed through a differential multiplexer 214 and then passed to a fast respond differential amplifier 217. The output of the amplifier 217 is routed to the sensor module controller 230, which is adapted to perform signal processing according to an embodiment of the disclosure.

The sensor module controller 230 may process sensed data to determine, for example, the presence of a vehicle, count the number of detected vehicles, and the speed of each passing vehicle. In some embodiments, the sensor module controller 230 gathers the sensed data from the magnetic sensors 212 and transmits the data for the base station 400 and/or traffic controller 402 (directly and/or via access point 300) to process the sensed data and determine the presence of a vehicle and other traffic parameters. The sensor module controller 230 further may include an analog to digital converter to convert the signal received from the differential amplifier 217 to digital information. The sensor module controller 230 may be further adapted to communicate with the communication controller 220, which is adapted to relay information to and from the access point 300.

Figure 6:
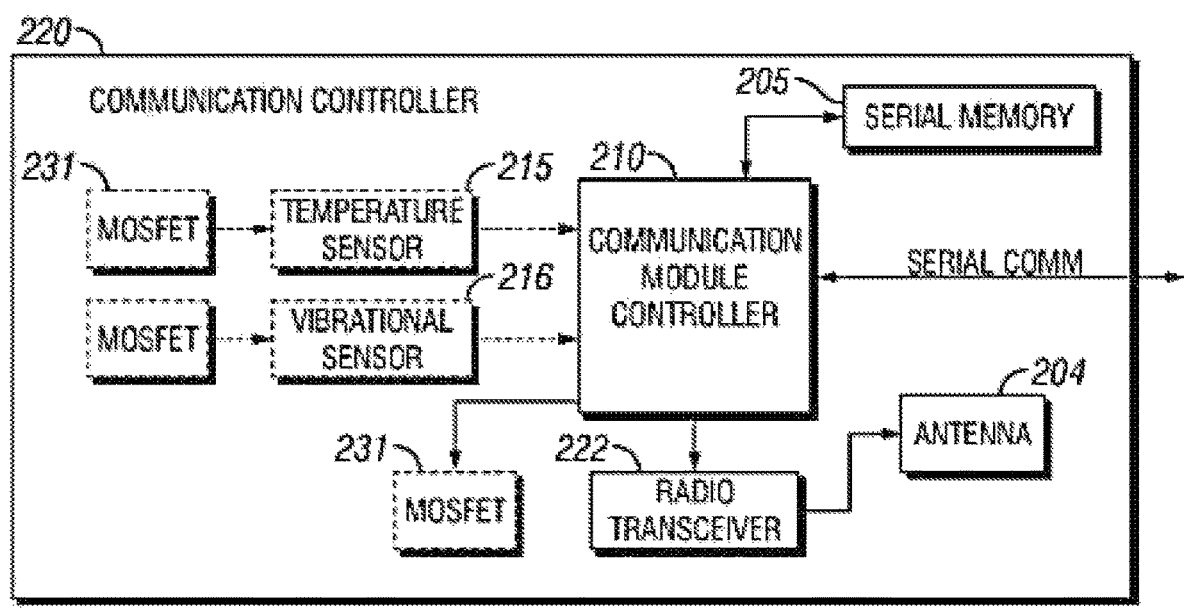
FIG. 6 is a schematic block diagram of a communication controller of a system according to a disclosed embodiment.

As illustrated in FIG. 6, the communication controller 220 may include one or more of a radio transceiver 222, an antenna 204, a serial memory 205, a communication module controller 210 and a MOSFET 231 or other power control device. According to an embodiment of the present disclosure, the communication controller 220 is adapted to receive signals from the vehicle detector controller 240 and generate a packet suitable to be wirelessly transmitted to the access point 300. The communication controller 220 also may perform overhead functions for the sensor pod 200 including, for example, the timing and synchronization of communicating data signals, and data formatting. One or more of the foregoing functions may be performed by the communication module controller 210 according an embodiment of the present disclosure. The communication module controller 210 also may receive sensed data from one or more temperature 215 and vibration 216 sensors and process the sensed data to determine, for example, the presence of ice, snow, water, and/or temperature measurements. A serial memory 205, as understood by those skilled in the art, also may be used to facilitate remote firmware upgrades to the sensor pods 200. The memory, according to an embodiment, may be non-transitory and may store one or more computer programs to be executed by the communication module controller 210 or the sensor module controller 230, for example, as will be understood by those skilled in the art.

The radio transceiver 222 of the communication controller 220 may be configured to communicate in any radio band. As just one example, the radio transceiver may communicate in the 902-928 Mhz ISM band according to an embodiment of the disclosure. In other embodiments, the radio transceiver 222 may be configured to communicate in the 433-435 MHz ISM band, or both the 433-435 MHz and the 902-928 Mhz ISM band, for example. An operating frequency in the 902-928 Mhz ISM or 433-434 MHz ISM band provides a greater communication range than the operating frequency of 2.4 Ghz, for example because the 2.4-2.5 Ghz ISB band typically has greater pass losses. Also, the airways of the 2.4-2.5 Ghz ISB band are more crowded than the 902-928 Mhz ISB because the 2.4-2.5 Ghz ISB band includes RF signals from common devices such as Wi-Fi hubs, and Bluetooth devices. A communication frequency of no more than 928 Mhz provides sufficiently low attenuation communication and range at the available power for the sensor pods according to embodiments of the present disclosure. Although exemplary embodiments of the sensor pods 200 include one or more radio transceivers 222 adapted to operate at a frequency at or less than 928 Mhz, a 2.4 Ghz operating frequency is suitable for some components of the wireless vehicle system such as the radio communication between the base station 400 and the access point 300.

Antenna size is inversely proportional to the frequency, and therefore, as understood by those skilled in the art, the size of an antenna operating at 900 Mhz is typically larger than an antenna operating at 2.4 Ghz. Embodiments of the sensor pod 200 may include an antenna 204 adapted to fit inside the enclosure of the sensor pod 200. In some embodiments, the antenna 204 may be low profile and adapted to be positioned in a substantially horizontal orientation when positioned inside the enclosure of the sensor pod 200, as illustrated in FIG. 3 for example, although other antenna orientations and/or positions are possible. The low profile antenna 204 also may have an antenna housing having a hollow interior to allow communication circuitry components to be mounted at least partially inside the antenna housing thereby decreasing vertical space requirements inside the enclosure of the sensor pod. In some embodiments the antenna 204 is a low profile loop antenna or a low profile patch antenna as understood by those skilled in the art.

Figure 13:
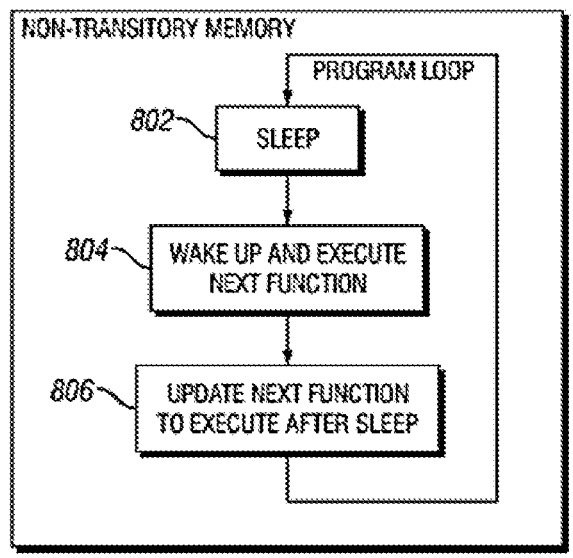
FIG. 13 is a flow chart depicting operation of a method associated with a wireless detection system according to an embodiment of the disclosure.

Embodiments of the sensor pod 200 may include one or more non-transitory memory having an executable program stored thereon to manage the power of the sensor pod 200. FIG. 13 illustrates an example embodiment of the instruction of a program loop executed by the sensor pod to manage power of the sensor pod 200. Both the vehicle detector and communication controllers 220, 240 spend most of the time in a power-saving sleep mode. Power management methods of embodiments of the disclosure enable the sensor pod 200 to run for a number years without replacing the battery. The program loop instructions illustrated in FIG. 13 may be implemented on both the vehicle detector controller 240 and the communication controller 220 individually and in combination. In step 802, for example, the sensor pod will go into a low power sleep mode 802 for a predetermined amount of time. When the sensor pod 200 wakes up, in step 804, for example, the controller executes the next function and then schedules a subsequent function in the chain to be executed in step 806 for example. According to an embodiment of the present disclosure, there is always one pending event or function to be executed by the sensor pod 200.

Figure 14:
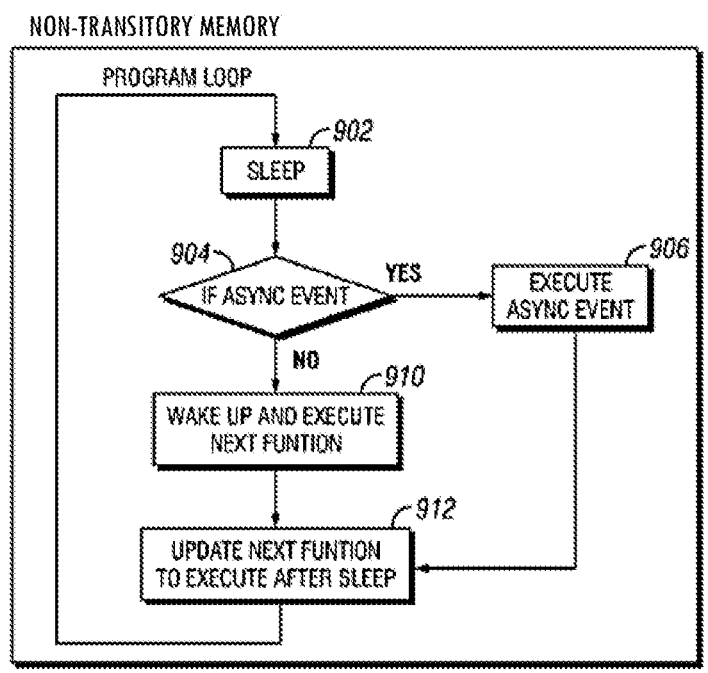
FIG. 14 is a flow chart depicting operation of a method for asynchronous events associated with a wireless vehicle detection system according to an embodiment of the present disclosure.

FIG. 14 illustrates an example embodiment of the instruction of a program loop executed by the sensor pod to manage asynchronous events associated with a wireless vehicle detection system. In step 902, for example, the sensor pod will go into a low power sleep mode 902. A determination is made at step 904 as to whether there is a sync event. If there is no sync event at step 910, the sensor pod wakes up and the controller executes the next function and then updates a next function in the chain to be executed after sleep in step 912. If the determination at step 904 is that there is a sync event, the sync event is executed at step 906. After execution of the sync event, the controller updates a next function in the chain to be executed after sleep in step 912.

Figure 7:
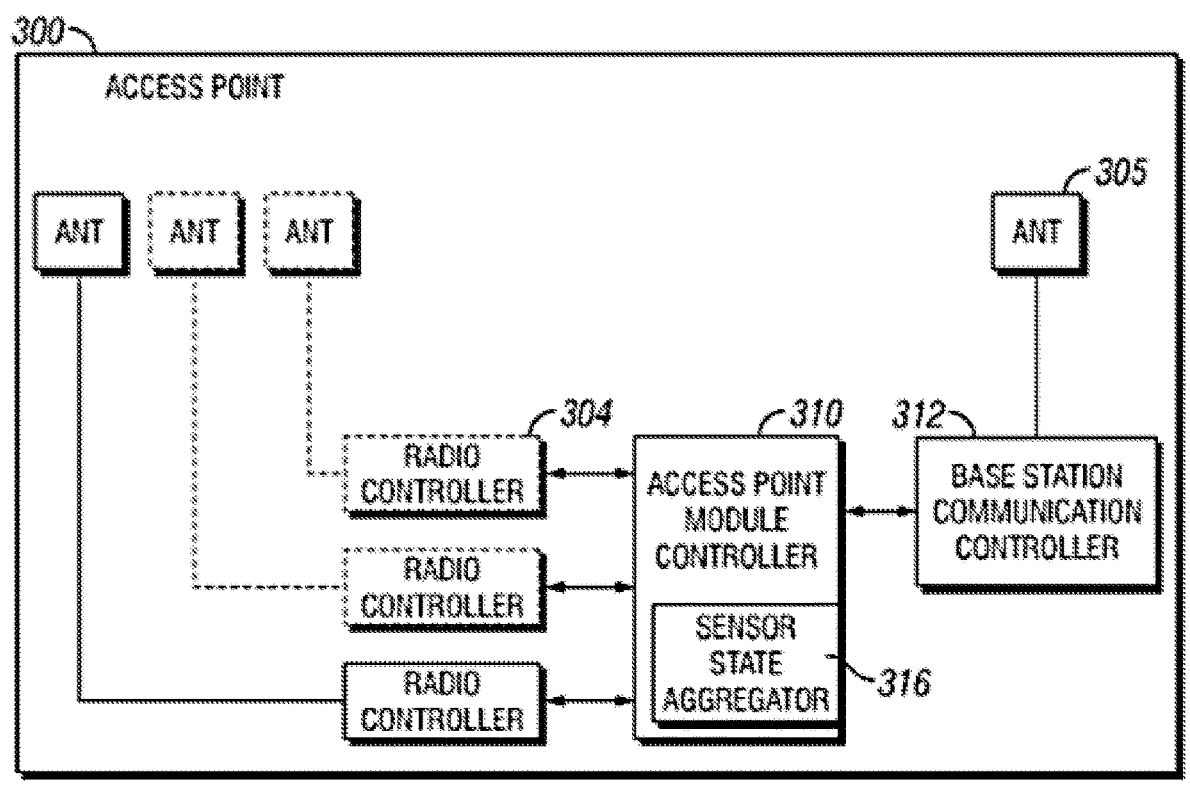
FIG. 7 is a schematic block diagram of an access point of a system according to a disclosed embodiment.

FIG. 7 illustrates a block diagram of an embodiment of an access point 300 that is adapted to communicate with a plurality of sensor pods 200 and a base station 400. A single access point 300 may communicate with up to 130 sensor pods according to some embodiments. The wireless vehicle detection system may include the use of a plurality of access points 300 at a traffic intersection. As user of the wireless vehicle detector system may map zones to include one or more sensor pods and an access point 300. Embodiments of the access point 300 may include a plurality of radio controllers 304 adapted to communicate with sensor pods 200. For example, in some embodiments, the radio controllers 304 may communicate at an operating frequency of approximately 900 Mhz, and one or more base station communication controllers 312 adapted to facilitate communication with the base station 400 at an operating frequency, such as at approximately 2.4 Ghz using an antenna 305. Each radio controller 304 may talk to multiple sensor pods 200 using a low-power randomized-time-of transmission TDMA protocol. The access point 300 may communicate with the base station by wire or wirelessly. According to an embodiment of the access point 300, a ZigBee radio module 312, as understood by those skilled in the art, is used to communicate wirelessly to the base station 400 and an RS-485 link, as understood by those skilled in the art, is used for wired communication. According to certain embodiments, all of the radio controllers 304 that are in communication with the sensor pods 200 are kept synchronized by the access point module controller 310. Synchronization allows the radio controllers to schedule transmission in the same time slots. This way, transmitting radios do not overload adjacent radio receivers. The access point module controller 310 is adapted to collect data from the plurality of radio controllers 304, aggregate the data, and transmit the data the base station 400 located in the traffic controller cabinet according to an embodiment of the disclosure.

Figure 8:
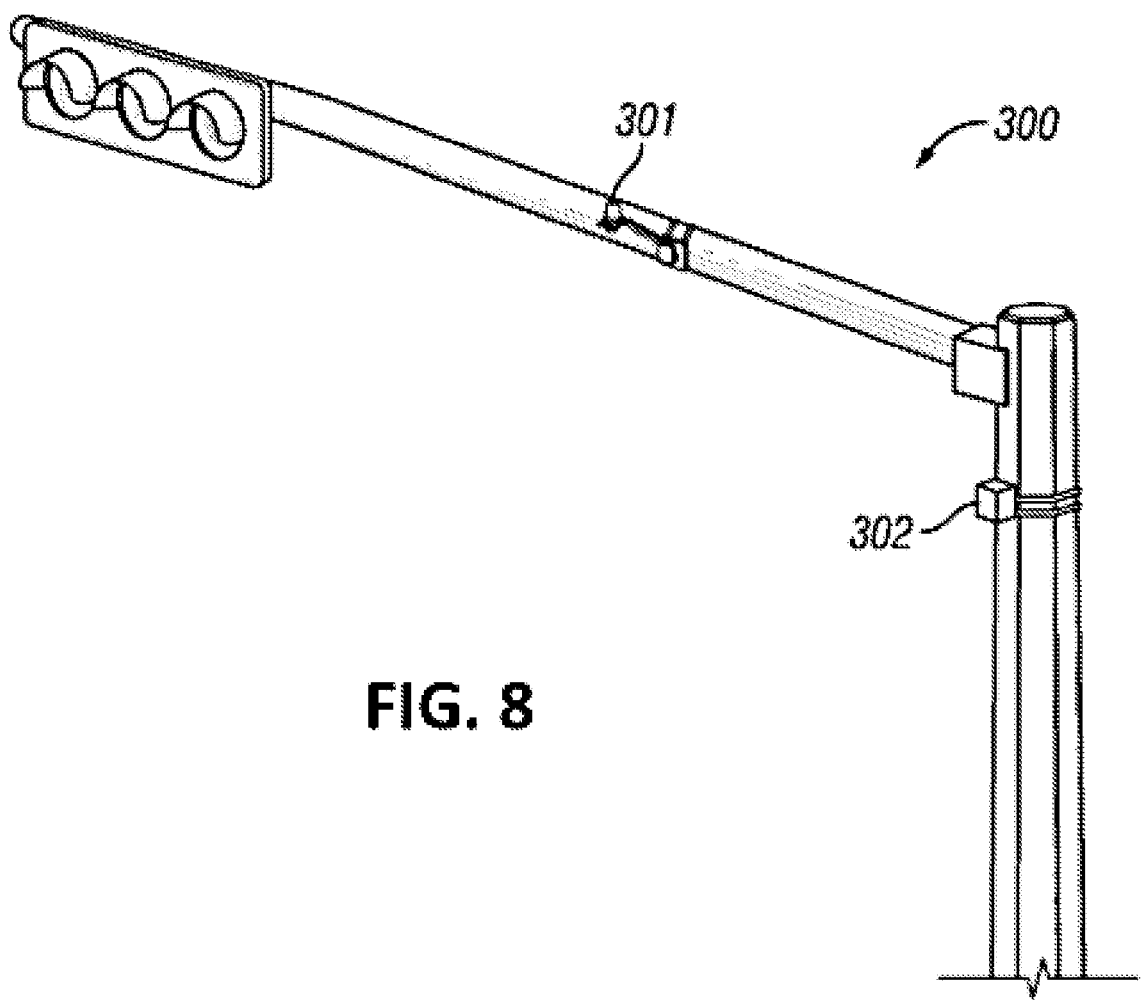
FIG. 8 is a schematic environmental perspective view of an access point and an omnidirectional antenna of a system according to a disclosed embodiment.
Figure 10:
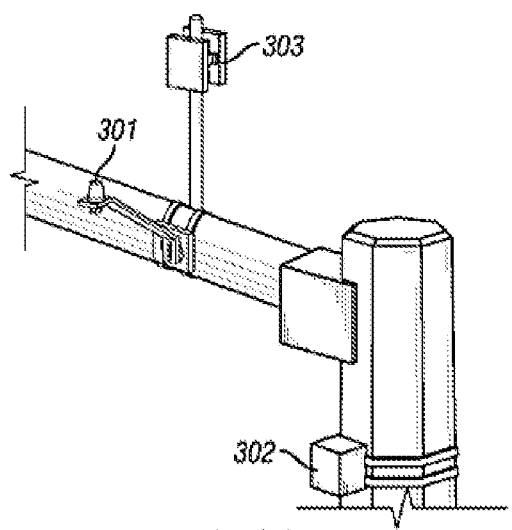
FIG. 10 is an environmental perspective view of an access point, an omnidirectional antenna, and panel antenna of a system according to a disclosed embodiment.

Embodiments of the access point 300 may include one or more antennas 301 and/or 303, positioned remotely from an access point housing 302. For example, the antennas 301, 303 may be mounted on a structure, such as a traffic signal as illustrated in FIGS. 8 and 10, although other mounting locations are possible. The one or more antennas 301, 303 are adapted to be in communication with the plurality of sensor pods 200 and further adapted to communicate with the access point housing 302, which in turn communicates with the base station 400.

According to an embodiment of the present disclosure, the antenna may be an omnidirectional antenna 301, as understood by those skilled in the art, mounted to a traffic pole or mass arm at and within approximately 300 feet of the plurality of sensor pods 200 and, in some embodiments may communicate at the operating frequency of approximately 900 Mhz.

Figure 12:
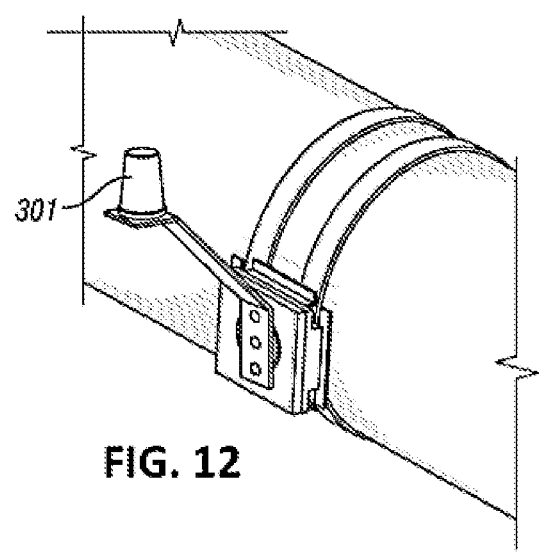
FIG. 12 is a perspective view of an omnidirectional antenna of a system according to an embodiment of the disclosure.

FIG. 12 illustrates the omnidirectional antenna 301 according to an embodiment of the disclosure. For traffic intersections that may require the sensor pods 200 to be approximately 300-700 feet from the access point 300, a combination of an omnidirectional antenna 301 and panel antennas 303 may be used as illustrated in FIG. 10 for example. In an example embodiment, the panel antennas 303 may communicate with the sensor pods 200 positioned 300-700 feet away and the omnidirectional antenna 301 may communicate with the sensor pods 200 positioned within 300 feet, although other arrangements are possible. For example, in some embodiments, only antenna 301 or antenna 303 is used. In other embodiments, antenna 301 may have a greater range than antenna 303 or both antennae may have the same range.

Figure 11:
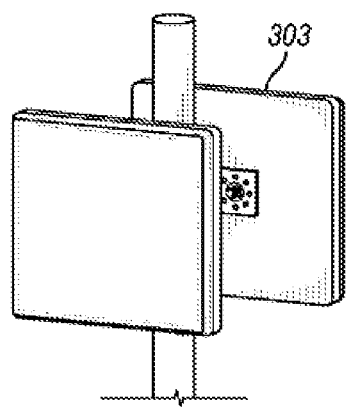
FIG. 11 is a perspective view of a panel antenna of a system according to an embodiment of the disclosure.

As illustrated in FIG. 11, according to an embodiment of the disclosure, the panel antenna 303 may be a directional antenna with two panel antennas mounted a predetermined distance between each other and a pole and/or other structure positioned there between. One or more RF cables and/or other wired and/or wireless communication means may be used to communicate data between the antennas 303, 301 and the access point housing 302.

Figure 9:
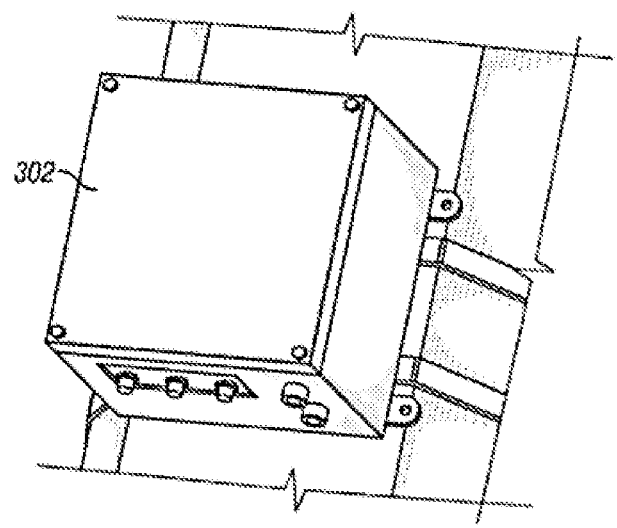
FIG. 9 is a perspective view of an access point of a system according to an embodiment of the disclosure.

FIG. 9 illustrates an embodiment of the access point housing 302 according to an embodiment of the disclosure. When selecting a mounting location for the access point 300, factors to be considered may include the elevation needed for RF communications, the line of sight to the traffic controller cabinet 600, the distance from the wireless sensor pods 200, and the accessibly of the mounted access point to field support personnel using a lift truck. The antennas 301, 303 may be mounted on a structure approximately 15-30 feet above ground, for example, on a traffic pole or mast arm and adjacent to the access point housing 302. The access point housing 302 may be placed in the line of site and close to the traffic controller cabinet 600 that houses the base station 400 according to an embodiment of the disclosure. When the access point 300 and base station 400 are communicating wirelessly, the access point 300 may receive approximately 120 VAC from an interface panel in the traffic controller cabinet 600 through a power cable connected there between. In other embodiments, the access point 300 receives power using the RS-485 link that is used for wired communication between the access point 300 and the base station 400.

Figure 20:
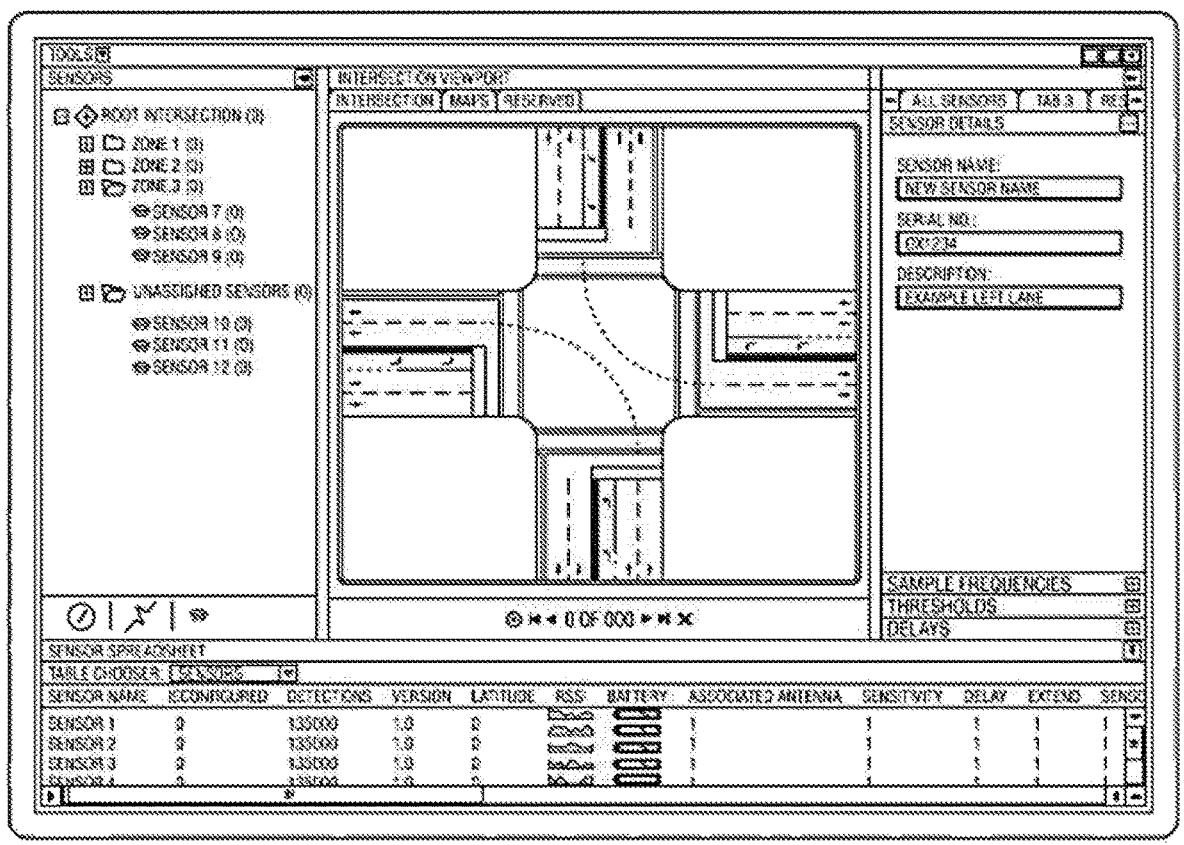
FIG. 20 is a graphical user interface to control a wireless vehicle detection system according to an embodiment of the disclosure.

Each traffic region may utilize one or more sensor pods 200, e.g., four or more sensor pods 200 in a series that make up a zone. Each zone may use an access point 300 that is in communication with the one or more sensor pods 200 according to an embodiment of the disclosure. The zones and sensor pods 200 may be mapped using a graphical user interface (GUI), such as illustrated in FIG. 20 for example. The base station 400 automatically detects the presences of sensor pods 200 and the GUI may be viewed on a remote device 407 to facilitate the mapping of the sensor pods 200 according to an embodiment of the disclosure. The interface may be viewed using a web browser and may illustrate, for example, a sensor tree that illustrates the organization of sensor pods 200, and details of individual sensor pods 200. As understood by those skilled in the art, such sensor details may include, for example, a sensor name, unique id, sensor description, the current mode, read right frequency, battery level, vehicle sample frequency, sensitivity, and detect timeout.

In an embodiment of the disclosure, sensor information and processed sensor data may be viewed using the GUI using data processed by the base station 400. The base station 400 has the computing power of an advance transportation controller (ATC), as understood by those skilled in the art, and is adapted to provide data processing and storage of data for a plurality of sensor pods 200 in a plurality of zones according to an embodiment of the disclosure. The base station 400 may be connected to a LAN or a WAN. In some embodiments, one or more web services are used on private networks to provide access to information relating to the wireless vehicle detector system 100.

Figure 15:
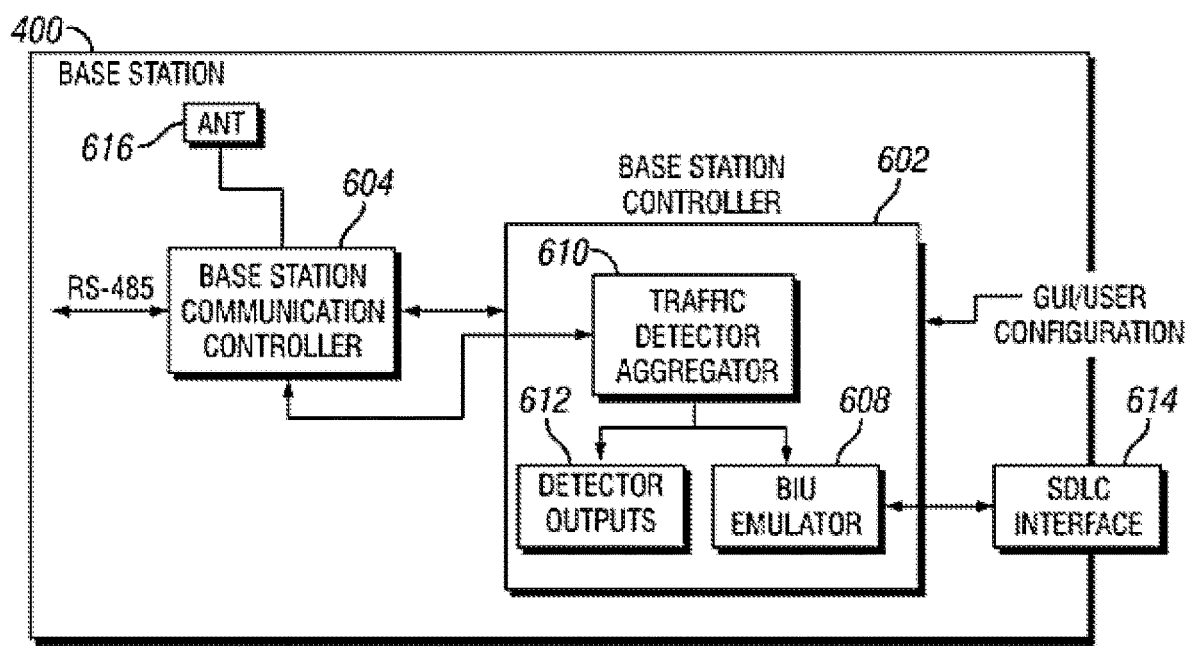
FIG. 15 is a block diagram of a base station of a system according to an embodiment of the disclosure.

As illustrated in FIG. 15, an embodiment of the base station 400 may include a base station controller 602, a base station communication controller 604, an antenna 616 (which in some embodiments may be adapted to communicate in the 2.4-2.5 Ghz ISB band), and a synchronous data link control (SDLC) interface 614 as understood by those skilled in the art. The SDLC interface 614 may be used to connect to a traffic controller 402. Embodiments of the disclosure include, for example, Bus Interface Units (BIU) to emulate detector to the traffic controller 402. The base station communication controller 604 may be adapted to facilitate communication with a plurality of access points 300. The base station controller 602 may include, for example, a traffic detector aggregator 610, detector outputs 612, and one or more BIU emulators 608. According to an embodiment, the base station is positioned near the top of the traffic controller cabinet 600 and an AC power cord is used to provide power between the base station 400 and an interface panel in the cabinet 600 as understood by those skilled in the art.

The base station 400 also may include one or more non-transitory memories encoded with one or more computer programs operable by the base station controller 602 according to an embodiment of the disclosure. The base station 400 may perform signal processing functions for the plurality of sensor pods 200 in the wireless vehicle detection system 100. For example, according to an embodiment of the disclosure, the base station 400 may execute one or more computer programs to analyze and interpret sensed data for counting the number of vehicles, occupancy, performing speed calculations (see, e.g., FIGS. 20-22), and other roadway conditions.

Figure 16:
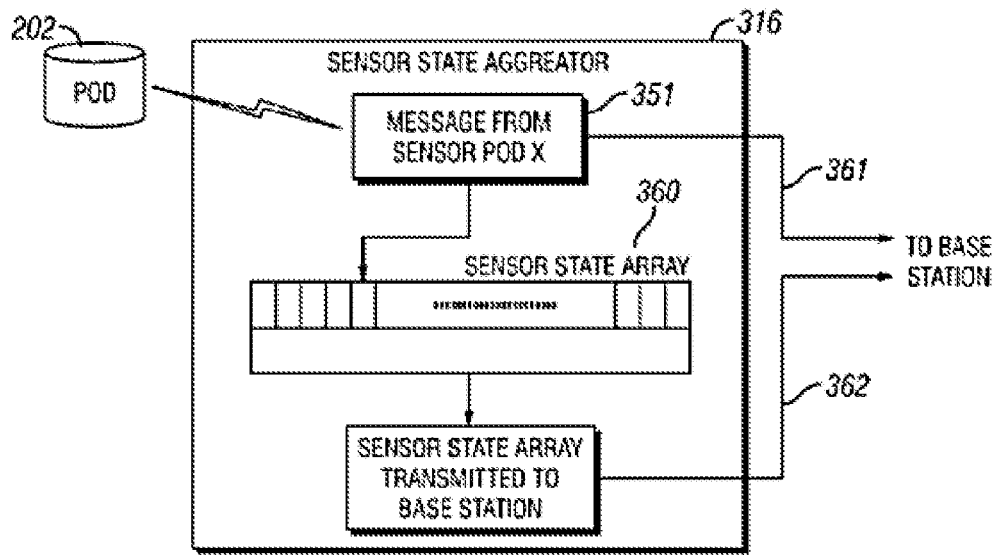
FIG. 16 is a block diagram of a sensor state aggregator of a system according to an embodiment of the disclosure.
Figure 17:
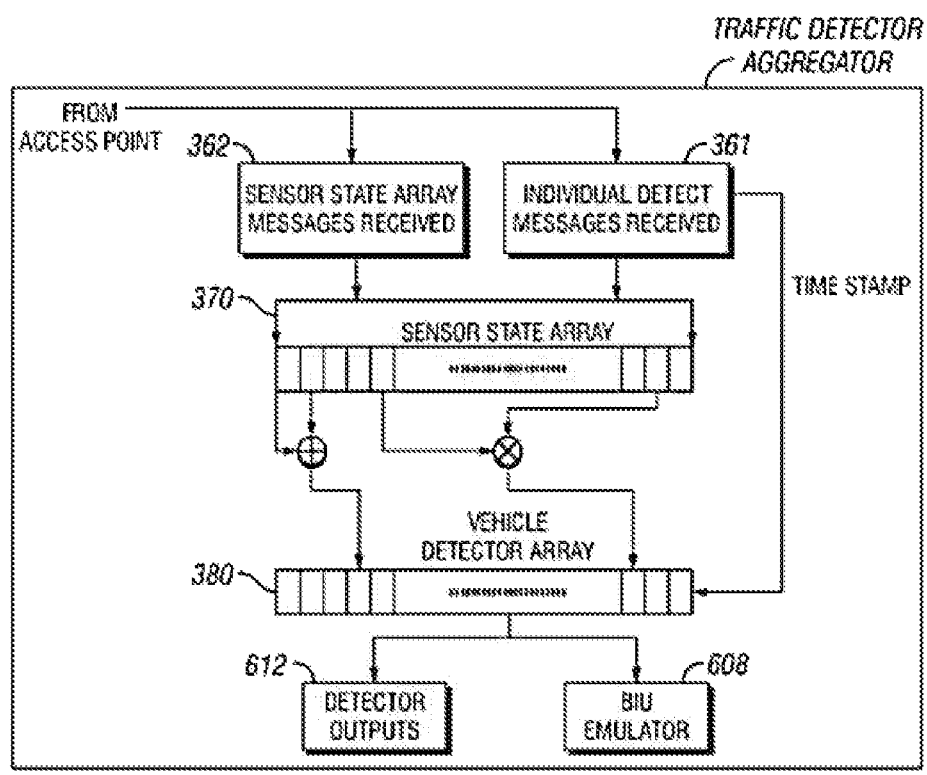
FIG. 17 is a block diagram of a traffic detector aggregator of a system according to an embodiment of the disclosure.

FIGS. 16 and 17 illustrate an embodiment of the sensor state aggregator 316 on or associated with an access point module controller 310. The sensor state aggregator 316 maintains a sensor state array 360 in which each attached sensor pod 200 has an entry. These entries for sensor pods 200 contain the current detect status for each sensor pod 200 in a zone. According to an embodiment of the disclosure, every message 351 sent by a sensor pod 200 to the access point 300 contains the current detect status. Using this status, the sensor state array 360 is updated with every message received and sent to the base station 400 periodically or upon demand. All of the individual status messages 361 are transferred to the base station 400 and may be responsive to an event trigger. The individual status messages 361 may include a time stamp associated with the status change, message, or both.

Embodiments of the disclosure may include, for example, a sensor state aggregator 316 that includes a set of instructions that cause the access point 300 to perform the operations when the instructions are executed by the access point module controller 310, for example. The operations of the sensor state aggregator 316 associated with the access point may include, for example, generating a first sensor state array 360, each of the one or more sensor pods 200 in the respective zone having an entry in the sensor state array. The operations of the sensor state aggregator 316 may further include, for example, updating the sensor state array 360 responsive to receiving one or more signals from the one or more sensor pods 200 in the respective zone, the one or more signals including current detect status of the one or more sensor pods 200, and communicating an output message indicating a time stamp and event trigger details responsive to receiving an individual status message 361 from one or more of the sensor pods 200 responsive to an event trigger. The operations of the sensor state aggregator 316 may further include, for example, communicating the updated sensor state array indicating current detect status of the one or more sensor pods 200 to the base station upon demand or periodically.

Figure 18:
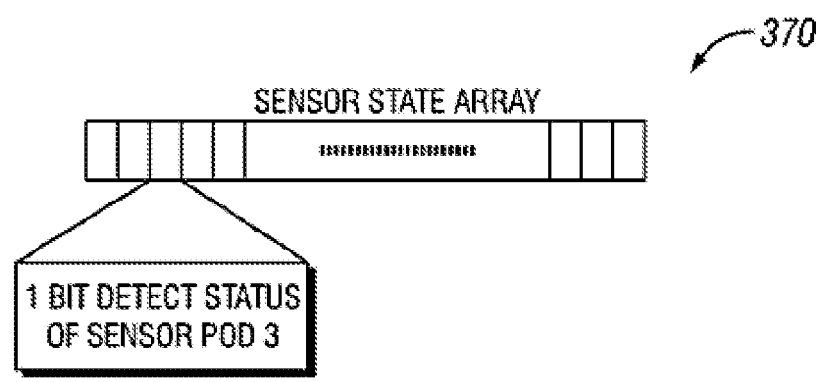
FIG. 18 is a schematic diagram of a sensor state array of a system according to an embodiment of the disclosure.
Figure 19:
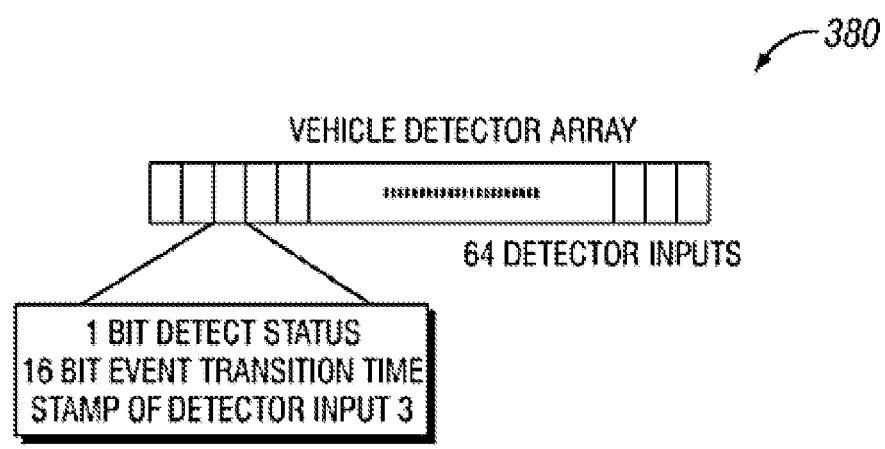
FIG. 19 is a schematic diagram of a vehicle detector array of a system according to an embodiment of the disclosure.

FIG. 17 illustrates an overview of a traffic detector aggregator 610 on or associated with the base station 400 according to embodiments of the present disclosure. The base station 400 receives the sensor state array message 362, and individual sensor messages 361 from the access point 300. Based on the type of message, it is parsed and routed differently as understood by those skilled in the art. According to an embodiment of the disclosure, every message from a sensor pod 200 may contain its detect status bit, but only the dedicated detect status messages 360 may contain the time stamp for the event as will be understood by those skilled in the art. The base station 400 also maintains a sensor state array 370 (see e.g., FIG. 18) that is similar to the sensor state array 360 associated with the access point 300. The sensor state array 370 associated with the base station 400, in some embodiments, includes information indicating the current detect status for all of the sensor pods 200 in the plurality of zones. The traffic detector aggregator 610 also may maintain a vehicle detector array 380, which maintains the status of numerous physical detector inputs 64 (see FIG. 19), along with a 16 bit time stamp of when the status changed last time. FIG. 19 illustrates an embodiment of the vehicle detector array 380. According to an embodiment of the vehicle detector array 380, the vehicle detector array 380 maintains the detector inputs 64 and the time stamp information for a plurality of sensor pods 200 in a plurality of zones.

Embodiments of the disclosure may include, for example, a traffic detector aggregator 610 that includes a set of instructions that cause the base station 400 (e.g., one or more processors) to perform the operations when the instructions are executed by the base station controller 602, for example. The instructions of the traffic detector aggregator 610 associated with the base station 400 is adapted to aggregate data from the plurality of access points 300 in the plurality of zones so that a user may configure and monitor the wireless vehicle detection system 100 according to an embodiment of the disclosure. The traffic detector aggregator 610 may include, for example, a set of instructions that cause the base station 400 (e.g., one or more processors located at the base station 400) to perform operations such as, generating a sensor state array 370 associated with the base station 400, each of the one or more sensor pods 200 in all of the zones having an entry in the sensor state array 370. Embodiments of the disclosure may further include operations such as updating the sensor state array 370 responsive to receiving updated sensor state array 360 from one of the plurality of access points 300. Embodiments of the disclosure may also include, for example, generating a vehicle detector array 380 comprising information indicating a physical detector input for each of the zones of and time stamps of event triggers, and updating the vehicle detector array 380 responsive to receiving the output message from one of the plurality of access points 300.

The sensor state arrays 370, traffic detector aggregator 610, and vehicle detector array 380 maintained by the base station 400 and the access point 300 may be implemented and maintained by electronic hardware, software, or a combination of the two as understood by those skilled in the art.

According to an embodiment, each zone is assigned a physical detector bit in the vehicle detector array 380 and each BIU 608 is mapped to 16 physical detector inputs. In an example embodiment, physical detector bits 1-16 are controlled by BIU1, 17-32 are controlled by BIU2, and so on. According to an embodiment, a base station 400 may emulate BIU's 1 to 4; in other embodiments the base station 400 may emulate BIU's 1 to 8 as understood by those skilled in the art. According to an embodiment, the vehicle detector array 380 is updated with every message received from every sensor pod 200 in all of the zones and the physical detector status is changed based on the user configured zone mapping. When the base station 400 emulates a BIU 608, it is adapted to respond to a request from the traffic controller 402 on the SDLC interface 614 as understood by those skilled in the art. The traffic controller 402 may act as a master and requests data from the BIU periodically.

An embodiment of a method to aggregate sensor data associated with an access point 300 in a wireless vehicle detection system, for example, may include maintaining accurate detect status, volume and occupancy data if communication to base station 400 is interrupted so that accuracy of data is not reduced by momentary disruptions or delays in communication to base station 400 and packing communication data for greater transfer efficiency. Together, these characteristics, among others, allow for the use of a low-cost RF link, such as ZigBee. Use of a wireless communication link between the access point 300 and the base station 400 is more convenient and less costly to install than a wired link in many cases. Aggregation and combination of the sensor data into detect states for input to the controller 602 at the base station 400, for example, allows for combination of individual sensor states and data to be combined in different ways to generate intelligent vehicle detection inputs and allows data to be formatted in different ways to support multiple interface methods to the controller. As understood by those skilled in the art, emulation of one or multiple BIUs 608, for example, allows for a simple and flexible way to transfer detection states to the controller and allows use of a pre-existing, standard interface (such as NEMA TS2) which, in turn, allows for ease of installation and configuration (e.g., only one serial cable connection is needed). As appreciated by those skilled in the art, embodiments of the present disclosure allow for configurable single or multiple BIUs accommodating different equipment configurations in the cabinet assembly without additional hardware assemblies, adapters, or multiple cables.

An embodiment of a method to aggregate sensor data associated with an access point 300 in a wireless vehicle detection system, for example, may include maintaining accurate detect status, volume and occupancy data if communication to base station 400 is interrupted so that accuracy of data is not reduced by momentary disruptions or delays in communication to base station 400 and packing communication data for greater transfer efficiency.

FIG. 21 is a method to determine the speed of a plurality of individual vehicles as the vehicles pass along sensors positioned along a vehicle pathway. For purposes of illustration, an embodiment of a plurality of a method depicted in FIG. 20 may be implemented in a base station 400.

Figure 21A:
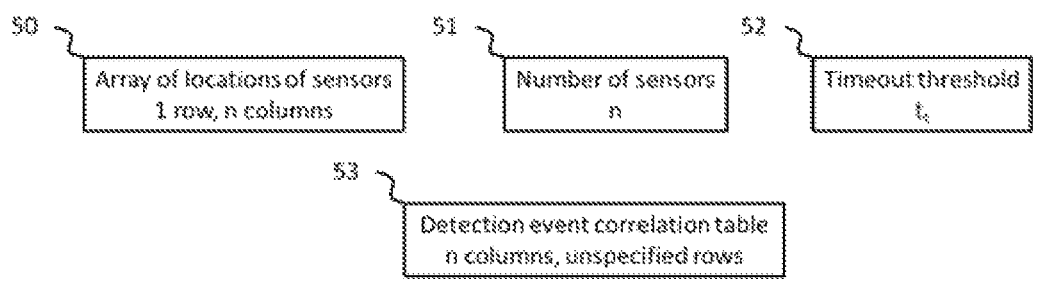
FIG. 21A is a schematic view of a data structures used as inputs by the methods associated with speed determination system according to a disclosed embodiment.

FIG. 21A shows data structures associated with the method according to an embodiment of the invention. The data structures include the array of locations of sensors 50, the number of sensors 51, the timeout threshold 52, and the detection even correlation table 53.

Figure 21B:
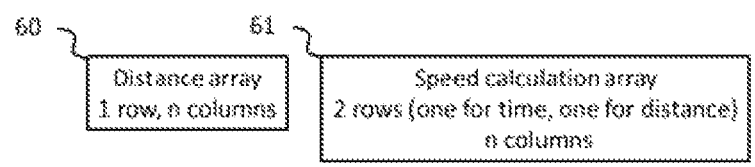
FIG. 21B is a schematic view of a data structures used temporarily by the methods associated with speed determination system according to a disclosed embodiment.

FIG. 21B shows data structures used temporarily by the method according to the embodiment of the invention. Each temporary data structure includes the distance array 60 and speed calculation array 61.

In one embodiment, the method may begin at an initial array configuration stage 700. Two arrays are created with one column for each sensor (such as sensor pod 200) that reports time data 710. One array contains the distance between the corresponding sensor and the preceding sensor. The first sensor, since it has no preceding sensor, has a distance of zero.

The second array is created to contain the times that are recorded by the data recording stage 130. As times are recorded from each sensor they are inserted into the corresponding column from top to bottom as illustrated below.

| Detection | |
|---|---|
| 0 | 1 |
| 100 | 2 |
| 200 | 3 |
| 300 | 4 |
| 400 | 5 |
| 500 | 6 |
| 1000 | 1 |
| 1200 | 3 |
| 1300 | 4 |
| 1400 | 5 |
| 1500 | 6 |
| 2000 | 1 |
| 2100 | 2 |
| 2200 | 3 |
| 2300 | 4 |
| 2400 | 5 |

| Sensor Number | | | | | |
|---|---|---|---|---|---|
| 0 | 1 | 2 | 3 | 4 | 5 |
| 0 | 100 | 200 | | 400 | 500 |
| 1000 | 2100 | 1200 | 1300 | 1400 | 1500 |
| 2000 | | 2200 | 2300 | 2400 | |
| 1000 | 2100 | 1200 | 1300 | 1400 | 1500 |
| 2000 | | 2200 | 2300 | 2400 | |
| 2000 | 2100 | 1200 | 1300 | 1400 | 1500 |
| | | 2200 | 2300 | 2400 | |
| 2000 | 2100 | 2200 | 2300 | 2400 | |
| empty set | | | | | |

After the configuration stage 700, the method proceeds to the data populating stage 730. From the data populating stage, the method proceeds to a conditional check for detection events 740. If a detection event is found, it is entered into the detection time table 750 and the timer is reset 760. The method then returns to the data populating stage 730.

If no detection event is found then the timer increments 770. After the timer is incremented, the timer count is checked relative to the timeout 780. If the timeout threshold has been met, the speed determination routine 800 is called. If the timer threshold has not been met, the method returns to the data populating stage 730.

The speed determination routine begins 800 by finding the earliest stored detection time. If no value is found in the check 810, the routine returns to the data populating stage 730. Otherwise, if any value is found this time then the corresponding distance from the location array is added to the speed determination. The routine proceeds to check the right adjacent cell in the top row of the detection time table for a value within the timeout threshold 220.

If the right adjacent cell is within the limit of the timeout threshold, the value in this cell and the corresponding distance from the distance array are added to the speed determination array. The right adjacent cell check 820 is performed again, and the process continues until the right adjacent cell does not exist or does not meet the threshold requirement. When the right adjacent cell does not exist or meet the threshold requirement, average speed and variance are determined using a speed calculation array 840 as illustrated in FIG. 22.

In one embodiment, the speed calculation routine begins by calculating the distances between the plurality of sensors for each measurement present in the speed calculation array 841. The time differential between each time pair is calculated in step 842. These differential values are calculated by the order in which the sensors were physically located. The sum of all distance differential values is then calculated 843. The sum of all time differential time values is then calculated 844.

A check for zero values of each of these sums is then performed 845. If either of the sums is equal to zero, then the routine proceeds back to the speed calculation stage 800. If neither of the sums is equal to zero, then the routine proceeds to determine an average speed by dividing the sum of the differential distances by the sum of the differential times 846. For each distance and time pair an interval speed also is calculated 847. The variance of these interval speeds is then calculated 848. Both the average speed and the variance of the interval speeds are then returned 849. The method then removes the times used in the speed determination from the speed determination table 850 and returns to the beginning of the speed calculation stage 800. In some embodiments, examples of the method above may be represented and stored as illustrated below.

| Sensor Number (i) | 0 | 1 | 2 | 3 | 4 | 5 | Tt | 500 |
|---|---|---|---|---|---|---|---|---|
| Δti | | 100 | 100 | 100 | 100 | 100 | Dt | 50 |
| Δdi | | 20 | 10 | 10 | 5 | 5 | Savg | 0.1 |
| Si | | 0.2 | 0.1 | 0.1 | 0.05 | 0.05 | Svar | 0.004 |
| Sensor Number (i) | 0 | 1 | 2 | 3 | 4 | 5 | Tt | |
| Δti | | | | | | | Dt | |
| Δdi | | | | | | | Savg | |
| Si | | | | | | | Svar | |
| Sensor Number (i) | 0 | 1 | 2 | 3 | 4 | 5 | Tt | 300 |
| Δti | | | | 100 | 100 | 100 | Dt | 20 |
| Δdi | | | | 10 | 5 | 5 | Savg | 0.07 |
| Si | | | | 0.1 | 0.05 | 0.05 | Svar | 0.001 |
| Sensor Number (i) | 0 | 1 | 2 | 3 | 4 | 5 | Tt | 300 |
| Δti | | 100 | 100 | 100 | 100 | | Dt | 45 |
| Δdi | | 20 | 10 | 10 | 5 | | Savg | 0.11 |
| Si | | 0.2 | 0.1 | 0.1 | 0.05 | | Svar | 0.004 |

-continued

| Sensor Number (i) | 0 | 1 | 2 | 3 | 4 | 5 | Tt |
|---|---|---|---|---|---|---|---|
| Δti | | | | | | | Dt |
| Δdi | | | | | | | Savg |
| Si | | | | | | | Svar |

Embodiments of methods and systems to control traffic speed as disclosed herein enhance accuracy of traffic control. These embodiments, for example, may be beneficial to calibrate and optimize traffic signal timing, identify congestion levels, trigger or determine traffic patterns, control signal timing and operations, increase or decrease the number of vehicle pathway or roadway lanes, raise or lower speed limits, and determine offset such as for calibrating the coordination of signals along a corridor, among others. These embodiments also, for example, enhance traffic planning for community, city, county, or other municipality for intersections and vehicle pathways as will be understood by those skilled in the art.

In the various embodiments of the disclosure described herein, a person having ordinary skill in the art will recognize that various types of memory are readable by a computer such as the memory described herein in reference to the various computers and servers, e.g., computer, computer server, web server, or other computers with embodiments of the present disclosure. Examples of computer readable media include but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, flash drives, memory sticks, and other newer types of memories, and transmission type media such as digital and analog communication links. For example, such media may include operating instructions, as well as instructions related to the system and the method steps described above and may operate on a computer. It will be understood by those skilled in the art that such media may be at other locations instead of, or in addition to, the locations described to store computer program products, e.g., including software thereon. It will be understood by those skilled in the art that the various software modules or electronic components described above may be implemented and maintained by electronic hardware, software, or a combination of the two, and those embodiments are contemplated by embodiments of the present disclosure.

It should be understood that the order of activity as depicted in the figures above are conceptual and may deviate without departing from the various embodiments disclosed. Moreover, the specification and drawings are, accordingly, to be regarded in an illustrative rather than a restrictive sense. It will, however, be evident that various modifications and changes may be made thereunto without departing from the broader spirit and scope of the disclosure. While different embodiments of the invention, including apparatuses, systems, and methods, have been shown or described in only some of its forms, it should be apparent to those skilled in the art that the invention is not so limited, but is susceptible to various changes without departing from the scope of the invention. Furthermore, it is to be understood that the above disclosed embodiments are merely illustrative of the principles and applications of the present invention. Accordingly, numerous modifications may be made to the illustrative embodiments and other arrangements may be devised without departing from the spirit and scope of the present invention.

What is claimed is:

1. A speed detection system for vehicle traffic, the system comprising:
a plurality of sensor pods positioned along a vehicle pathway, each of the plurality of sensor pods positioned to detect presence data of a plurality of vehicles and broadcast to a base station the detected presence data; and
the base station positioned remote from the plurality of sensor pods and configured to:
receive the detected presence data; and
determine speed of each of the plurality of vehicles even when one or more of the plurality of sensor pods fails to detect the presence of one of the plurality of vehicles, the vehicle speed being determined at a periodic interval responsive to a predetermined distance between the plurality of sensor pods and a difference in a detection time of the vehicle at each of the plurality of sensor pods, wherein determining the speed of each of the plurality of vehicles comprises:
calculating distances between each of the plurality of sensor pods for each measurement present in the presence data;
calculating a difference of each arrival time in the presence data;
calculating a sum of all the distances between the plurality of sensors; and
calculating a sum of all differences of arrival times.

2. The speed detection system for vehicle traffic of claim 1, further comprising:
an access point positioned to receive the detected presence data from the plurality of sensor pods and transmit the detected presence data to the base station.

3. The speed detection system for vehicle traffic of claim 1, further comprising:
a remote device that is configured to:
receive the determined speed of each of the plurality of vehicles; and
display a graphical user interface comprising the determined speed of each of the plurality of vehicles in response to receiving the determined speed of each of the plurality of vehicles.

4. The speed detection system for vehicle traffic of claim 1, wherein:
the plurality of sensor pods are spaced apart along the vehicle pathway in a location underlying the vehicle pathway, and
two or more of distances between any two of the plurality of sensor pods are not the same.

5. The speed detection system for vehicle traffic of claim 1, wherein:
the plurality of sensor pods are spaced apart along the vehicle pathway in a uniform manner.

6. The speed detection system for vehicle traffic of claim 1, wherein:
determining the speed of each of the plurality of vehicles comprises:
examining arrival time data for evidence of directionality of a particular vehicle; and
using multiple sensors in a same position to reduce a possibility of incorrect directionality determinations.

7. The speed detection system for vehicle traffic of claim 6, wherein:
determining the speed of each of the plurality of vehicles further comprises:
correlating the arrival time data with events associated with a passing of individual objects;
limiting errors in direction determination;
reporting a direction and speed determined of the individual objects; and
reporting any case in which the direction determined does not match data of a predetermined direction of a traffic flow direction.

8. A method for controlling vehicle traffic of a plurality of vehicles when traveling along a vehicle pathway, the method comprising:
generating, from a plurality of sensor pods spaced apart along a roadway, presence data of each of a plurality of vehicles;
transmitting the presence data to a base station;
determining, at the base station, a speed of each of the plurality of vehicles, the speed being determined at a periodic interval based at least in part on both 1) a predetermined distance between the plurality of sensor pods and 2) a difference in a detection time of each of the plurality of vehicles at each of the plurality of sensor pods, wherein determining the speed of each of the plurality of vehicles comprises:
calculating distances between each of the plurality of sensor pods for each measurement present in the presence data;
calculating a difference of each arrival time in the presence data;
calculating a sum of all the distances between the plurality of sensor pods; and
calculating a sum of all differences of arrival times; and
displaying the determined speed on a graphical user interface thereby to control traffic along the vehicle pathway.

9. The method for controlling vehicle traffic of a plurality of vehicles when traveling along a vehicle pathway of claim 8, wherein:
transmitting the presence data to a base station comprises a first transmission of the presence data from the plurality of sensor pods to an access point and a second transmission of the presence data from the access point to the base station.

10. The method for controlling vehicle traffic of a plurality of vehicles when traveling along a vehicle pathway of claim 8, wherein:
generating the presence data comprises outputting sensed data from each of the plurality of sensor pods in a form of an arrival time corresponding to the presence of the plurality of moving vehicles.

11. The method for controlling vehicle traffic of a plurality of vehicles when traveling along a vehicle pathway of claim 8, wherein:
determining the speed of each of the plurality of vehicles comprises:
generating a first data table with columns for each sensor and rows to be populated with one or more distances between the plurality of sensor pods;
generating a second data table with columns for each sensor and rows to be populated with one or more arrival times associated with the plurality of moving vehicles sensed by the plurality of sensor pods;
providing a predefined amount of timeout value representative of a time to wait to perform speed determinations after observing the one or more arrival times; and
correlating the one or more arrival times.

12. The method for controlling vehicle traffic of a plurality of vehicles when traveling along a vehicle pathway of claim 11, further comprising:
populating data related to detection events in a table;
checking for the detection events;
entering the detection events to a detection data table if a detection event is found;
resetting a timer to repeat the data populating of the table;
incrementing a timer when no detection event is found; and
checking a count of the timer against the predefined amount of timeout value.

13. The method for controlling vehicle traffic of a plurality of vehicles when traveling along a vehicle pathway of claim 12, wherein:
the speed of each of the plurality of vehicles is determined only when the predefined amount of timeout value has been met.

14. A method of operating a base station, the method comprising:
receiving, from a plurality of sensor pods, presence data of each of a plurality of vehicles;
determining a speed of each of the plurality of vehicles, the speed being determined at a periodic interval based at least in part on both 1) a predetermined distance between the plurality of sensor pods and 2) a difference in a detection time of each of the plurality of vehicles at each of the plurality of sensor pods, wherein determining the speed of each of the plurality of vehicles comprises:
calculating distances between each of the plurality of sensor pods for each measurement present in the presence data;
calculating a difference of each arrival time in the presence data;
calculating a sum of all the distances between the plurality of sensor pods; and
calculating a sum of all differences of arrival times; and
sending the determined speed of each of the plurality of vehicles to a remote device, thereby causing the remote computing device to display a graphical user interface comprising the determined speed.

15. The method of operating a base station of claim 14, wherein:
the speed of each of the plurality of vehicles is further determined based at least in part on an earliest arrival time as detected by each of the plurality of sensor pods.

16. The method of operating a base station of claim 14, wherein:
determining the speed of each of the plurality of vehicles comprises determining an average speed and variance of the speed of each of the plurality of vehicles.

17. The method of operating a base station of claim 14, wherein:
the speed for at least one of the plurality of vehicles is determined using only presence data from a subset of the plurality of sensor pods.

18. The method of operating a base station of claim 14, wherein:
the presence data is received from the plurality of sensor pods via an access point.

19. The method of operating a base station of claim 18, wherein:
the access point is positioned within 700 feet of at least some of the plurality of sensor pods.

* * * * *